(12) United States Patent
Austin et al.

(10) Patent No.: US 11,941,225 B1
(45) Date of Patent: Mar. 26, 2024

(54) SYSTEMS AND METHODS FOR SELF-DIRECTED INVESTING

(71) Applicant: United Services Automobile Association (USAA), San Antonio, TX (US)

(72) Inventors: Meghan Diana Austin, San Antonio, TX (US); Tiffany Michelle Maples-Nikkel, San Antonio, TX (US); Rebecca Noelle Larson, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 16/152,231

(22) Filed: Oct. 4, 2018

(51) Int. Cl.
*G06F 3/048* (2013.01)
*G06F 3/0482* (2013.01)
(Continued)

(52) U.S. Cl.
CPC ....... *G06F 3/0482* (2013.01); *G06Q 30/0625* (2013.01); *G06Q 30/0641* (2013.01); *G06Q 40/06* (2013.01)

(58) Field of Classification Search
CPC ........ G06Q 40/04; G06Q 40/06; G06Q 40/00; G06Q 10/0637; G06Q 30/0224;
(Continued)

(56) References Cited

U.S. PATENT DOCUMENTS 5,297,031 A * 3/1994 Gutterman ............. G06Q 40/04
705/37
5,588,107 A * 12/1996 Bowden ................ G06F 3/0482
715/828
(Continued)

OTHER PUBLICATIONS

Hung Wing and R. M. Colomb, "A CASE for electronic documentary dossier," Proceedings Sixth Australian Conference on Computer-Human Interaction, Hamilton, New Zealand, 1996, pp. 86-93, doi: 10.1109/OZCHI.1996.559992. (Year: 1996).*

(Continued)

*Primary Examiner* — Steven B Theriault
(74) *Attorney, Agent, or Firm* — Fletcher Yoder P.C.

(57) ABSTRACT

In one embodiment, a system includes a user interface generation system comprising one or more processors configured to generate a graphical user interface configured to be displayed via a display of a user computing device. The graphical user interface is configured to receive one or more inputs relating to a financial trade. The user interface generation system is also configured to transmit the graphical user interface to the user computing device. In addition, the graphical user interface includes executable code defining a plurality of components encapsulated within the graphical user interface. Each component includes one or more properties and one or more states. The one or more properties and the one or more states relate to the financial trade. The executable code of the graphical user interface is configured to receive the one or more inputs relating to the financial trade from the plurality of components, and to update and (Continued)

render the one or more properties and/or the one or more states of the plurality of components based at least in part on the one or more inputs.

20 Claims, 37 Drawing Sheets

(51) Int. Cl.
  *G06Q 30/0601* (2023.01)
  *G06Q 40/06* (2012.01)
(58) Field of Classification Search
  CPC ........... G06Q 30/0625; G06Q 30/0641; G06Q 50/188; G06F 16/24557; G06F 3/0481; G06F 3/0482; G06F 3/04886; G06F 16/2457; G06F 3/04842; G06F 3/04847; G06F 2203/04803; G06F 16/24578; G06F 16/9535; G06F 16/21; G06F 16/22; G06F 16/287; G06F 16/00; G06F 16/252; G06F 17/18; G06F 16/24575; G06F 16/313; G06F 40/221; G06F 40/30; G06F 16/2379; G06F 16/90335; G06F 17/40; G06F 3/04817; G06F 3/0484; G06F 3/0485; G06F 3/0488; G06F 40/40; G06F 40/58; H04L 41/22
  See application file for complete search history.

(56) References Cited

U.S. PATENT DOCUMENTS

| | | | | |
|---|---|---|---|---|
| 5,774,877 | A * | 6/1998 | Patterson, Jr. | G06Q 40/04 718/104 |
| 5,787,402 | A * | 7/1998 | Potter | G06Q 20/10 705/37 |
| 5,797,002 | A * | 8/1998 | Patterson, Jr. | G06Q 20/32 |
| 5,963,938 | A * | 10/1999 | Wilson | G06F 16/332 |
| 5,986,657 | A * | 11/1999 | Berteig | G06F 3/0481 715/792 |
| 6,154,750 | A * | 11/2000 | Roberge | G16H 10/60 |
| 6,233,566 | B1 * | 5/2001 | Levine | G06Q 40/02 705/36 R |
| 6,252,597 | B1 * | 6/2001 | Lokuge | G06F 3/0481 715/841 |
| 6,408,282 | B1 * | 6/2002 | Buist | G06Q 40/04 705/36 R |
| 6,625,583 | B1 * | 9/2003 | Silverman | G06F 3/0483 705/35 |
| 6,768,981 | B2 * | 7/2004 | Patterson, Jr. | G06Q 40/00 705/35 |
| 6,950,993 | B2 * | 9/2005 | Breinberg | G06F 8/38 715/788 |
| 6,983,421 | B1 * | 1/2006 | Lahti | G06F 9/451 715/744 |
| 7,130,823 | B1 * | 10/2006 | Rayner | G06Q 40/00 705/37 |
| 7,146,336 | B2 * | 12/2006 | Olsen | G06Q 40/00 705/37 |
| 7,242,413 | B2 * | 7/2007 | Chu | G06F 9/451 345/619 |
| 7,278,113 | B1 * | 10/2007 | Racine | G06Q 10/08 715/780 |
| 7,287,233 | B2 * | 10/2007 | Arend | G06F 3/0481 715/800 |
| 7,360,167 | B2 * | 4/2008 | Hennum | G06F 3/04842 345/619 |
| 7,389,258 | B2 * | 6/2008 | Brumfield | G06Q 40/00 705/35 |
| 7,409,364 | B1 * | 8/2008 | Barton | G06Q 10/00 705/35 |
| 7,523,064 | B2 * | 4/2009 | Burns | G06Q 40/04 705/37 |
| 7,546,550 | B1 * | 6/2009 | Buck | G06F 3/0482 715/834 |
| 7,620,580 | B1 * | 11/2009 | Rose | G06Q 30/0601 705/30 |
| 7,689,498 | B2 * | 3/2010 | Rodgers | G06Q 40/00 705/35 |
| 7,696,997 | B2 * | 4/2010 | Heaton | G06T 11/206 345/440 |
| 7,720,742 | B1 * | 5/2010 | Mauro | G06Q 40/025 705/37 |
| 7,746,363 | B2 * | 6/2010 | Fritz | G06F 3/0481 345/682 |
| 7,792,748 | B1 * | 9/2010 | Ebersole | G06Q 40/00 705/39 |
| 7,813,977 | B2 * | 10/2010 | Heaton | G06Q 40/00 705/35 |
| 7,853,512 | B1 * | 12/2010 | Lora | G06Q 40/00 705/37 |
| 8,051,000 | B2 * | 11/2011 | Kurczek | G06Q 40/06 705/37 |
| 8,060,434 | B1 * | 11/2011 | Mauro | G06Q 40/00 705/37 |
| 8,117,553 | B2 * | 2/2012 | Danninger | G06F 16/957 715/806 |
| 8,131,626 | B2 * | 3/2012 | Langridge | G06F 3/0482 705/37 |
| 8,255,315 | B1 * | 8/2012 | May | G06Q 40/04 705/37 |
| 8,490,010 | B2 * | 7/2013 | Stienhans | G06F 9/451 705/14.1 |
| 8,495,504 | B2 * | 7/2013 | Brugler | G06F 3/0482 715/767 |
| 8,504,938 | B2 * | 8/2013 | Vaughan | G06F 3/0482 715/781 |
| 8,566,212 | B2 * | 10/2013 | Lutnick | G06Q 40/04 705/37 |
| 8,578,271 | B2 * | 11/2013 | Laugwitz | G06Q 10/00 715/713 |
| 8,706,597 | B1 * | 4/2014 | Forsythe | G06Q 40/06 705/36 R |
| 8,862,507 | B2 * | 10/2014 | Sandhu | G06Q 30/0601 705/26.41 |
| 9,064,280 | B2 * | 6/2015 | Lorbiecki | G06Q 30/0635 |
| 9,164,654 | B2 * | 10/2015 | Goertz | G06F 3/04855 |
| 9,557,887 | B2 * | 1/2017 | Muller | G06F 3/0482 |
| 9,652,803 | B2 * | 5/2017 | Lane | G06Q 40/04 |
| 9,805,417 | B2 * | 10/2017 | Kemp, II | G06Q 40/04 |
| 9,928,550 | B2 * | 3/2018 | Kaminsky | G06Q 40/025 |
| 9,942,736 | B1 * | 4/2018 | Sharp | H04W 4/18 |
| 10,025,842 | B1 * | 7/2018 | Charyk | G06F 21/604 |
| 10,055,784 | B1 * | 8/2018 | Boelter | G06F 16/9535 |
| 10,074,144 | B2 * | 9/2018 | Fishberg | G06N 20/00 |
| 10,242,407 | B1 * | 3/2019 | Hunt | G06Q 40/06 |
| 10,482,526 | B2 * | 11/2019 | Park | G06F 3/04847 |
| 10,636,085 | B1 * | 4/2020 | Lovett | G06F 3/0482 |
| 10,755,323 | B2 * | 8/2020 | Kuruvila | G06Q 30/04 |
| 10,768,977 | B1 * | 9/2020 | Paul | H04L 67/34 |
| 10,915,952 | B2 * | 2/2021 | Sandow | G06Q 40/04 |
| 2002/0055901 | A1 * | 5/2002 | Gianakouros | G06Q 10/109 705/37 |
| 2002/0065739 | A1 * | 5/2002 | Florance | G06Q 30/06 705/26.43 |
| 2002/0120543 | A1 * | 8/2002 | Brittingham | G06Q 40/00 705/36 R |
| 2002/0133453 | A1 * | 9/2002 | Rose | G06Q 40/00 705/37 |
| 2002/0138389 | A1 * | 9/2002 | Martone | G06F 16/95 705/36 R |
| 2002/0194110 | A1 * | 12/2002 | Young | G06Q 40/04 705/37 |
| 2002/0194111 | A1 * | 12/2002 | Young | G06Q 40/04 705/37 |
| 2003/0004852 | A1 * | 1/2003 | Burns | G06Q 40/00 705/37 |
| 2003/0009411 | A1 * | 1/2003 | Ram | G06Q 40/025 705/37 |

(56) References Cited

U.S. PATENT DOCUMENTS

| | | | |
|---|---|---|---|
| 2003/0070171 A1* | 4/2003 | Jeon | H04N 21/482 725/56 |
| 2003/0093362 A1* | 5/2003 | Tupper | G06Q 40/04 705/37 |
| 2003/0115120 A1* | 6/2003 | Kramer | G06Q 40/00 705/35 |
| 2003/0164859 A1* | 9/2003 | Evans | G06F 3/0481 715/792 |
| 2004/0078227 A1* | 4/2004 | Morris | G16H 40/20 705/2 |
| 2004/0119745 A1* | 6/2004 | Bartek | G06F 3/0481 715/763 |
| 2005/0015296 A1* | 1/2005 | Dougan | G06Q 30/02 705/36 R |
| 2005/0022136 A1* | 1/2005 | Hatscher | G06F 3/0481 715/798 |
| 2005/0125268 A1* | 6/2005 | Danninger | G06Q 10/10 705/6 |
| 2005/0149873 A1* | 7/2005 | Guido | G06F 3/0482 715/734 |
| 2006/0020538 A1* | 1/2006 | Ram | G06F 3/0482 705/37 |
| 2006/0059019 A1* | 3/2006 | Komischke | G06Q 10/10 705/3 |
| 2006/0069635 A1* | 3/2006 | Ram | G06Q 30/08 705/37 |
| 2006/0129569 A1* | 6/2006 | Dieberger | G06F 3/0482 |
| 2006/0173772 A1* | 8/2006 | Hayes | G06Q 40/02 705/37 |
| 2006/0277136 A1* | 12/2006 | O'Connor | G06Q 40/04 705/37 |
| 2007/0118452 A1* | 5/2007 | Mather | G06Q 40/06 705/36 R |
| 2007/0192230 A1* | 8/2007 | Meacham | G06F 16/24557 705/37 |
| 2008/0104039 A1* | 5/2008 | Lowson | G06Q 30/00 |
| 2008/0228633 A1* | 9/2008 | Kalt | G06Q 40/04 705/37 |
| 2008/0243711 A1* | 10/2008 | Aymeloglu | G06Q 40/06 705/36 R |
| 2009/0076978 A1* | 3/2009 | Dayan | G06Q 40/04 705/36 R |
| 2009/0187511 A1* | 7/2009 | Doornebos | G06Q 40/00 705/36 R |
| 2009/0292633 A1* | 11/2009 | Crist | G06Q 40/06 705/37 |
| 2009/0299914 A1* | 12/2009 | Moran | G06Q 10/10 705/36 R |
| 2010/0042552 A1* | 2/2010 | Horowitz | G06Q 40/00 705/36 R |
| 2010/0057600 A1* | 3/2010 | Johansen | G06F 8/34 705/37 |
| 2010/0064247 A1* | 3/2010 | Alford, Jr. | G06F 3/0483 715/781 |
| 2010/0064252 A1* | 3/2010 | Kramer | G06F 40/174 715/810 |
| 2011/0320335 A1* | 12/2011 | Gorelik | G06Q 40/06 705/37 |
| 2012/0116973 A1* | 5/2012 | Klein | G06Q 20/40 705/44 |
| 2013/0031506 A1* | 1/2013 | Diaz | G06Q 50/12 715/781 |
| 2013/0151322 A1* | 6/2013 | Coviello | G06Q 30/0207 705/14.23 |
| 2013/0274034 A1* | 10/2013 | Sawatari | G06Q 10/06 473/407 |
| 2013/0290216 A1* | 10/2013 | Scheffler | G06Q 40/04 705/36 R |
| 2014/0047036 A1* | 2/2014 | Nabat | G06Q 10/02 709/205 |
| 2014/0108293 A1* | 4/2014 | Barrett | G06Q 40/04 705/36 R |
| 2014/0229403 A1* | 8/2014 | Ramkumar | G06Q 40/06 705/36 R |
| 2014/0279369 A1* | 9/2014 | Turner | G06Q 40/04 705/37 |
| 2015/0089355 A1* | 3/2015 | Peng | G06F 40/106 715/244 |
| 2015/0235318 A1* | 8/2015 | Huan | G06Q 40/04 705/37 |
| 2015/0262396 A1* | 9/2015 | Devarajan | G06F 3/0486 345/440.1 |
| 2016/0012018 A1* | 1/2016 | Do Ba | H04L 12/6418 715/234 |
| 2016/0063630 A1* | 3/2016 | Molloy | G06F 3/04847 705/36 R |
| 2016/0103565 A1* | 4/2016 | Greenberg | G06F 3/04842 715/833 |
| 2016/0103651 A1* | 4/2016 | Greenberg | G06F 3/0488 700/94 |
| 2016/0103805 A1* | 4/2016 | Greenberg | G06F 3/04817 715/760 |
| 2016/0103897 A1* | 4/2016 | Nysewander | G06F 16/2428 707/602 |
| 2016/0196244 A1* | 7/2016 | Greenberg | G06F 40/143 715/205 |
| 2016/0342935 A1* | 11/2016 | Greenberg | G06F 40/134 |
| 2016/0350730 A1* | 12/2016 | Greenberg | G06Q 20/386 |
| 2016/0357373 A1* | 12/2016 | Greenberg | G09G 5/005 |
| 2017/0004563 A1* | 1/2017 | Noviello | G06Q 30/0633 |
| 2017/0017634 A1* | 1/2017 | Levine | H04L 67/53 |
| 2017/0278189 A1* | 9/2017 | Ignatovich | G06F 11/263 |
| 2018/0096415 A1* | 4/2018 | Garris | G06Q 30/0269 |
| 2018/0300225 A1* | 10/2018 | Topholt | G06F 11/3692 |
| 2018/0322581 A1* | 11/2018 | Kelley | G06Q 40/06 |
| 2019/0220928 A1* | 7/2019 | Puma | G06Q 40/06 |

OTHER PUBLICATIONS

T. Tekusova and J. Kohlhammer, "Applying Animation to the Visual Analysis of Financial Time-Dependent Data," 2007 11th International Conference Information Visualization (IV '07), Zurich, 2007, pp. 101-108, doi: 10.1109/IV.2007.28. (Year: 2007).*

* cited by examiner

NEW ORDER ✕
COMPLETE AND SUBMIT THE FORM BELOW TO PLACE AN ORDER.

ACCOUNT DETAILS

SELECT YOUR ACCOUNT SOURCE.
INDIVIDUAL BROKERAGE *1092 ⌄

AVAILABLE TO INVEST
CASH $4,051.90
NON-MARGINABLE $8,384.10
MARGINABLE $16,768.20

SELECT AN INVESTMENT

SEARCH NAME OR SYMBOL.
HORIZON TELECOM (HZ) 🔍

QUOTE AS OF APRIL 17, 2018 3:48PM CST

| NAME (SYMBOL) | SECURITY TYPE |
|---|---|
| HORIZON TELECOM (HZ) | STOCK / ETF |
| LAST TRADE PRICE $45.00 | DAY RANGE $44.75-$45.10 |
| BID / ASK $46.10 / $44.90 | 52 WEEK RANGE $43.45-$58.10 |
| DAY CHANGE ▲ $0.04 (0.06%) | TODAY'S VOLUME 58,343 |

WHAT ARE ALL THESE NUMBERS?
> VIEW MORE DETAILS

TRANSACTION TYPE
LEARN MORE ABOUT TRANSACTION TYPES.

SELECT A TRANSACTION TYPE.
○ BUY    ⦿ SELL

ORDER TYPE
LEARN MORE ABOUT ORDER TYPES.

SELECT AN ORDER TYPE.
○ MARKET ORDER    ⦿ LIMIT ORDER
○ STOP ORDERS    ○ TRAILING STOP ORDERS

BUY OR SELL AT A PRICE YOU SET OR BETTER.

ENTER YOUR LIMIT PRICE.
$46.00

QUANTITY
ENTER NUMBER OF SHARES. WHOLE NUMBER ONLY
5

EXPLAIN OPTIONAL
☐ SELL ALL (12) SHARES

YOUR ESTIMATED NET TOTAL INCLUDING COMMISSION AND FEES COMES OUT TO $216.95 THIS TOTAL IS SUBJECT TO CHANGE BASED ON MARKET EXECUTION

DURATION
LEARN MORE ABOUT DURATION

SELECT HOW LONG YOUR ORDER WILL REMAIN OPEN
○ DAY ONLY    ⦿ GOOD UNTIL CANCELLED (180 DAYS)

ADDTIONAL ORDER SELECTIONS

SELECT A QUALIFIER.  EXPLAIN  OPTIONAL
☑ DO NOT REDUCE

LIMIT ORDER TO BUY OR TO SELL, OR A STOP LIMIT ORDER TO SELL THAT IS NOT TO BE REDUCED BY THE AMOUNT OF ORDINARY CASH DIVIDEND ON THE EX-DIVIDEND DATE

CHANGE YOUR LEDGER. EXPLAIN OPTIONAL
⦿ MARGIN ACCOUNT    ○ CASH ACCOUNT

CHANGE YOUR LEDGER. EXPLAIN OPTIONAL
LAST IN, FIRST OUT (LIFO) ⌄

CHANGES TO TAX ACCORDING METHOD WILL ONLY APPLY TO THIS ORDER

| PREVIEW |
| CLEAR |

FIG. 8

NEW ORDER ✕
COMPLETE AND SUBMIT THE FORM BELOW TO PLACE AN ORDER.

ACCOUNT DETAILS

SELECT YOUR ACCOUNT SOURCE.
INDIVIDUAL BROKERAGE *1092 ⌄

AVAILABLE TO INVEST
CASH: $4,192.05
NON-MARGINABLE: $3,500.00
MARGINABLE: -$5,000.00

SELECT AN INVESTMENT
YOU CAN START WITH A FUND, COMPANY NAME, SYMBOL SEARCH OR MAKE A SELECTION FROM YOUR CURRENT POSITIONS

SEARCH NAME OR SYMBOL.
HORIZON TELECOM (HZ)   🔍

QUOTE AS OF APRIL 17, 2018 3:48PM CST

NAME (SYMBOL)
HORIZON TELECOM (HZ)
SECURITY TYPE
STOCK / ETF
LAST TRADE PRICE
$45.00
DAY RANGE
$46.06–$46.46
BID / ASK
$46.26 / $44.90
52 WEEK RANGE
$43.45–$58.10
DAY CHANGE
▼ $0.04 (0.06%)
TODAY'S VOLUME
58,343

WHAT ARE ALL THESE NUMBERS?
› VIEW MORE DETAILS

TRANSACTION TYPE
LEARN MORE ABOUT TRANSACTION TYPES.

SELECT A TRANSACTION TYPE.
⦿ BUY
○ SELL
○ SELL SHORT
○ OPTIONS TRADING

---

ORDER TYPE
LEARN MORE ABOUT ORDER TYPES.

SELECT AN ORDER TYPE.
⦿ MARKET ORDER
○ LIMIT ORDER
○ STOP ORDERS
○ TRAILING STOP ORDERS

YOU HAVE SELECTED A MARKET ORDER. A MARKET ORDER WILL EXECUTE AT THE FIRST AVAILABLE PRICE.

QUANTITY
+ SHOW AVAILABLE FUNDS

ENTER A NUMBER OF SHARES
NOT ENOUGH FUNDS
25

YOUR ESTIMATED TRADE AMOUNT EXCEEDS YOUR AVAILABLE TO TRADE BALANCE.
YOU CAN REDUCE YOUR TRADE AMOUNT OR TRANSFER FUNDS.

| PREVIEW TRADE |
| CLEAR |

FIG. 10

NEW ORDER
COMPLETE AND SUBMIT THE FORM BELOW TO PLACE AN ORDER.

ACCOUNT DETAILS
SELECT YOUR ACCOUNT SOURCE.
INDIVIDUAL BROKERAGE *1092

AVAILABLE TO INVEST
CASH: $4,192.05
NON-MARGINABLE: $4,051.90
MARGINABLE: $8,103.80

SELECT AN INVESTMENT
SEARCH NAME OR SYMBOL.
HORIZON TELECOM (HZ)

QUOTE AS OF AUGUST 2, 2018 9:32AM CST
NAME (SYMBOL)
HORIZON TELECOM (HZ)
SECURITY TYPE
STOCK / ETF
LAST PRICE
$45.00
DAY RANGE
$46.06–$46.46
BID / ASK
$46.26 / $44.90
52 WEEK RANGE
$43.45–$58.10
DAY CHANGE
▲ $0.04 (0.06%)
TODAY'S VOLUME
58,343

WHAT ARE ALL THESE NUMBERS?
> VIEW MORE DETAILS

TRANSACTION TYPE
LEARN MORE ABOUT TRANSACTION TYPES.

SELECT A TRANSACTION TYPE.
○ BUY
⦿ SELL

ORDER TYPE
LEARN MORE ABOUT ORDER TYPES.
⦿ MARKET ORDER
○ LIMIT ORDER
○ STOP ORDERS
○ TRAILING STOP ORDERS

BY SELECTING MARKET ORDER YOU WILL BE ABLE TO BUY OR SELL AT THE FIRST AVAILABLE PRICE.

ENTER LIMIT PRICE: EXPLAIN
$46.00

---

QUANTITY
HOW WOULD YOU LIKE TO ENTER YOUR QUANTITY?
EXPLAIN —108
⦿ NUMBER OF SHARES
○ ESTIMATED DOLLAR AMOUNT
○ SELL ALL (32) SHARES

ENTER NUMBER OF SHARES
WHOLE NUMBER ONLY
5

YOUR ESTIMATED NET TOTAL INCLUDING COMMISSION AND FEES COMES OUT TO $288.95. THIS TOTAL IS SUBJECT TO CHANGE BASED ON MARKET EXECUTION.

DURATION
LEARN MORE ABOUT DURATION

SELECT HOW LONG YOU ORDER WILL REMAIN OPEN FOR:
○ DAY ONLY
⦿ GOOD UNTIL CANCELLED (180 DAYS)

OPTIONAL ORDER SELECTIONS
CHANGE YOUR LEDGER.
OPTIONAL    EXPLAIN —134
⦿ MARGIN AMOUNT
○ CASH ACCOUNT

CHANGE YOUR ACCOUNT METHOD.
OPTIONAL    EXPLAIN —138
FIRST IN, FIRST OUT (FIFO)

CHANGES TO TAX ACCORDING METHOD WILL ONLY APPLY TO THIS ORDER

[ PREVIEW ]
[ CLEAR ]

FIG. 17

NEW ORDER ✕
COMPLETE AND SUBMIT THE FORM BELOW TO PLACE AN ORDER.
ACCOUNT DETAILS
SELECT YOUR ACCOUNT SOURCE.
INDIVIDUAL BROKERAGE *1092    ∨

AVAILABLE TO INVEST
CASH: $4,192.05
NON-MARGINABLE: $4,051.90
MARGINABLE: $8,103.80

SELECT AN INVESTMENT
SEARCH NAME OR SYMBOL.
HORIZON TELECOM (HZ)    🔍

QUOTE AS OF AUGUST 2, 2018 9:32AM CST
NAME (SYMBOL)
HORIZON TELECOM (HZ)
SECURITY TYPE
STOCK / ETF
LAST PRICE
$45.00
DAY RANGE
$46.06-$46.46
BID / ASK
$46.26 / $44.90
52 WEEK RANGE
$43.45-$58.10
DAY CHANGE
▲ $0.04 (0.06%)
TODAY'S VOLUME
58,343

WHAT ARE ALL THESE NUMBERS?
> VIEW MORE DETAILS
TRANSACTION TYPE
LEARN MORE ABOUT TRANSACTION TYPES.
SELECT A TRANSACTION TYPE.
⦿ BUY
○ SELL
○ SELL SHORT
○ OPTIONS TRADING

ORDER TYPE
LEARN MORE ABOUT ORDER TYPES.
○ MARKET ORDER
○ LIMIT ORDER
○ STOP ORDERS
⦿ TRAILING STOP ORDERS
BY SELECTING TRAILING STOP ORDER AN ORDER WILL TRIGGER WHEN THE STOP PRICE IS MET.
SELECT STOP LOSS OR LIMIT
○ TRADING STOP LOSS
⦿ TRADING STOP LOSS
DOLLAR ($) — 160    PERCENTAGE (%)
ENTER 2ND AMOUNT:    EXPLAIN
$1.00
FULL AMOUNT...
LAST SALE PRICE    ∨

QUANTITY
HOW WOULD YOU LIKE TO ENTER YOUR QUANTITY?
EXPLAIN —108
⦿ NUMBER OF SHARES
○ ESTIMATED DOLLAR AMOUNT
ENTER NUMBER OF SHARES
WHOLE NUMBER ONLY
5
YOUR ESTIMATED NET TOTAL INCLUDING COMMISSION AND FEES COMES OUT TO $288.95. THIS TOTAL IS SUBJECT TO CHANGE BASED ON MARKET EXECUTION.

DURATION
LEARN MORE ABOUT DURATION
SELECT HOW LONG YOU ORDER WILL REMAIN OPEN FOR:
⦿ DAY ONLY
○ GOOD UNTIL CANCELLED (180 DAYS)

OPTIONAL ORDER SELECTIONS
SELECT A QUALIFIER.
EXPLAIN     ←—126
☐ ALL OR NONE

CHANGE YOUR LEDGER:
EXPLAIN —134
⦿ MARGIN ACCOUNT
○ CASH ACCOUNT

[ PREVIEW ]
[ CLEAR ]

FIG. 20

NEW ORDER ✕
COMPLETE AND SUBMIT THE FORM BELOW TO PLACE AN ORDER.

ACCOUNT DETAILS

SELECT YOUR ACCOUNT SOURCE.
INDIVIDUAL BROKERAGE *1092 ⌄

| AVAILABLE TO INVEST | |
|---|---|
| CASH | $4,051.90 |
| NON-MARGINABLE | $4,051.90 |
| MARGINABLE | $8,103.80 |

SELECT AN INVESTMENT

SEARCH NAME OR SYMBOL. 🔍
GENERAL PRODUCTS (GP)

QUOTE AS OF AUGUST 2, 2018 9:32AM CST

| NAME (SYMBOL) | SECURITY TYPE |
|---|---|
| GENERAL PRODUCTS (GP) | STOCK / ETF |
| LAST TRADE PRICE | DAY RANGE |
| $4.86 | $4.82-$5.04 |
| BID / ASK | 52 WEEK RANGE |
| $4.50 / N/A | $4.45-$11.87 |
| DAY CHANGE | TODAY'S VOLUME |
| ▼ -$0.08 (-1.52%) | 157,848 |

WHAT ARE ALL THESE NUMBERS?
> VIEW MORE DETAILS

TRANSACTION TYPE
LEARN MORE ABOUT TRANSACTION TYPES.

SELECT A TRANSACTION TYPE.
○ BUY    ○ SELL
○ SHORT SELL    ⦿ OPTIONS TRADING

SELECT AN OPTIONS TRANSACTION
⦿ BUY CALL TO OPEN    ○ BUY PUT TO OPEN
○ SELL CALL TO OPEN    ○ SELL PUT TO OPEN

OPTIONS CONTRACT
LEARN MORE ABOUT OPTIONS CONTRACTS

| SELECT AN EXPIRATION DATE | SELECT A STRIKE PRICE |
|---|---|
| APRIL 20, 2018 ⌄ | $45 ⌄ |

QUOTE AS OF APRIL 17, 2018 3:48PM CST

| NAME (SYMBOL) | SECURITY TYPE |
|---|---|
| GENERAL PRODUCTS (GP) | STOCK / ETF |
| LAST TRADE PRICE | BREAK EVEN |
| $0.33 | $4.82 / 6.51% |
| BID / ASK | 52 WEEK RANGE |
| $0.30 / $0.39 | $4.00-$4.30 |
| DAY CHANGE | TODAY'S VOLUME |
| ▼ $0.05 (15%) | 1,000 |

WHAT ARE ALL THESE NUMBERS?
> VIEW MORE DETAILS

---

ORDER TYPE
LEARN MORE ABOUT ORDER TYPES.

SELECT AN ORDER TYPE.
○ MARKET ORDER    ⦿ LIMIT ORDER
○ STOP ORDERS    ○ TRAILING STOP ORDERS

BUY OR SELL AT A PRICE YOU SET OR BETTER.

ENTER YOUR LIMIT PRICE.
$0.29

QUANTITY

ENTER NUMBER OF CONTRACTS. EXPLAIN  1 CONTACT=100 SHARES
2

EXPLAIN  OPTIONAL
☐ SELL ALL (23) CONTRACTS

YOUR ESTIMATED TOTAL INCLUDING COMMISSION AND FEES IS $66.95 FOR 2 CONTRACTS OF $4.5 CALL GENERAL PRODUCTS APRIL 20.

DURATION
LEARN MORE ABOUT DURATION

SELECT HOW LONG YOUR ORDER WILL REMAIN OPEN
○ DAY ONLY    ⦿ GOOD UNTIL CANCELLED (180 DAYS)

ADDITIONAL ORDER SELECTIONS

SELECT A QUALIFIER. EXPLAIN  OPTIONAL
☐ DO NOT REDUCE    ☐ ALL OR NONE

[ PREVIEW TRADE ]

[ CLEAR ]

FIG. 26

```
NEW ORDER                                    ×
COMPLETE AND SUBMIT THE FORM BELOW
TO PLACE AN ORDER.
ACCOUNT DETAILS
SELECT YOUR ACCOUNT SOURCE.
INDIVIDUAL BROKERAGE *1092           ⌄
  AVAILABLE TO INVEST
  CASH: $4,192.05
  NON-MARGINABLE: $4,051.90
  MARGINABLE: $8,103.80
SELECT AN INVESTMENT
SEARCH NAME OR SYMBOL.              🔍
AGGRESSIVE GROWTH FUND (AGMX)
QUOTE AS OF AUGUST 2, 2018 9:32AM CST
  NAME (SYMBOL)
  AGGRESSIVE GROWTH FUND
  (AGMFX)
  LAST PRICE
  $45.39
  DAY CHANGE
  ▲ $1.35 (3.07%)
  52 WEEK RANGE
  $39.75-$47.76
WHAT ARE ALL THESE NUMBERS?
> VIEW MORE DETAILS
TRANSACTION TYPE
LEARN MORE ABOUT TRANSACTION TYPES.
SELECT A TRANSACTION TYPE.
⦿ BUY
○ SELL
○ EXCHANGE INTO AGMFX
○ EXCHANGE FROM AGMFX
PURCHASE AMOUNT
ENTER A DOLLAR AMOUNT.
$50.00 MINIMUM
$120.00
YOUR INITIAL ESTIMATED NET
TOTAL INCLUDING FEES IS $120.00
        PREVIEW TRADE
           CLEAR
```

FIG. 27

NEW ORDER ✕
COMPLETE AND SUBMIT THE FORM BELOW TO PLACE AN ORDER.

ACCOUNT DETAILS

SELECT YOUR ACCOUNT SOURCE.
INDIVIDUAL BROKERAGE *1092 ⌄ — 78

AVAILABLE TO INVEST
CASH: $4,192.05
NON-MARGINABLE: $4,051.90
MARGINABLE: $8,103.80

SELECT AN INVESTMENT

SEARCH NAME OR SYMBOL.
AGGRESSIVE GROWTH FUND (AGMFX) 🔍 — 82

QUOTE AS OF AUGUST 2, 2018 9:32AM CST

NAME (SYMBOL)
AGGRESSIVE GROWTH FUND
(AGMFX)

LAST PRICE
$45.39

DAY CHANGE
▲ $1.35 (3.07%)

52 WEEK RANGE
$39.75–$47.76

WHAT ARE ALL THESE NUMBERS?
> VIEW MORE DETAILS

TRANSACTION TYPE
LEARN MORE ABOUT TRANSACTION TYPES.

SELECT A TRANSACTION TYPE.
○ BUY
○ SELL
⦿ EXCHANGE INTO AGMFX
○ EXCHANGE FROM AGMFX 76
80
84
86
90
88

SELECT FUND TO ECHANGE FROM — 230

SELECT A FUND FROM WHAT YOU OWN.
INCOME FUND (IMFX) ⌄

HOW MUCH OF THIS MUTUAL FUND WOULD
YOU LIKE TO EXCHANGE? — 228
MINIMUN $50.00
$500.00 — 234

OPTIONAL — 236
☐ EXCHANGE ALL MY SHARES

PREVIEW
CLEAR 232
116
118
114

FIG. 31

```
NEW ORDER                          ×
COMPLETE AND SUBMIT THE FORM BELOW
TO PLACE AN ORDER.
ORDER DETAILS
  ACCOUNT #361092
  AVAILABLE TO INVEST - $4,192.05
  NAME/SYMBOL
  HORIZON TELECOM /HZ
  ORDER TYPE
  MARKET ORDER
  SECURITY TYPE
  STOCK /ETF
  TRANSACTION TYPE
  BUY
  LAST PRICE
  $26.24
  DURATION
  DAY ONLY
  NUMBER OR SHARES
  5
  ESTIMATED FEES
  $0.00
  ESTIMATED COMMISSION
  $8.95
  ESTIMATED NET TOTAL
  $151.45

> VIEW MORE DETAILS

IT MAY TAKE UP TO TWO BUSINESS DAYS
AFTER THE TRADE DATE FOR THE OFFICIAL
TRANSFER OF OWNERSHIP OF SHARES (OR
"SETTLEMENT DATE") TO OCCUR. DURING THIS
TIME, FUNDS GENERATED BY A SAFE WILL
NOT BE AVAILABLE FOR WITHDRAWAL.

[ PLACE ORDER ]
[ EDIT ]
```

FIG. 35

SYSTEMS AND METHODS FOR SELF-DIRECTED INVESTING

BACKGROUND

The present disclosure relates generally to systems and methods for providing information on a user interface and, more specifically, to systems and methods for providing information on a user interface to facilitate self-directed investing.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Conventional systems and methods of facilitating interaction with financial trading systems tend to provide graphical user interfaces that tend to be relatively unintuitive, as well as doing a relatively poor job of guiding less experienced investors through the process of executing financial trades. Accordingly, such less experienced investors may shy away from performing financial trades on their own, instead preferring to hire financial advisors to perform these duties for them. As such, there is a need for enhanced graphical user interfaces that facilitate self-directed investing.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a system includes a user interface generation system comprising one or more processors configured to generate a graphical user interface configured to be displayed via a display of a user computing device. The graphical user interface is configured to receive one or more inputs relating to a financial trade. The user interface generation system is also configured to transmit the graphical user interface to the user computing device. In addition, the graphical user interface includes executable code defining a plurality of components encapsulated within the graphical user interface. Each component includes one or more properties and one or more states. The one or more properties and the one or more states relate to the financial trade. The executable code of the graphical user interface is configured to receive the one or more inputs relating to the financial trade from the plurality of components, and to update and render the one or more properties and/or the one or more states of the plurality of components based at least in part on the one or more inputs.

In another embodiment, a method includes generating, via one or more processors of a user interface generation system, a graphical user interface configured to be displayed via a display of a user computing device. The graphical user interface comprises executable code defining a plurality of components encapsulated within the graphical user interface. Each component includes one or more properties and one or more states. The one or more properties and the one or more states relate to a financial trade. The graphical user interface is configured to receive one or more inputs relating to the financial trade. The method also includes transmitting, via a communication component of the user interface generation system, the graphical user interface to the user computing device. The method further includes receiving, via the graphical user interface, one or more inputs relating to the financial trade from the plurality of components. In addition, the method includes updating and rendering, via the graphical user interface, the one or more properties and/or the one or more states of the plurality of components based at least in part on the one or more inputs.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

DRAWINGS

These and other features, aspects, and advantages of the present disclosure will become better understood when the following detailed description is read with reference to the accompanying drawings in which like characters represent like parts throughout the drawings, wherein:

FIG. 8 illustrates an example of a secondary pane of a graphical user interface that enables a user to execute a sell with a limit order and duration options, in accordance with embodiments of the present disclosure;

FIG. 10 illustrates an example of a secondary pane of a graphical user interface that has generated an error message, in accordance with embodiments of the present disclosure;

FIG. 17 illustrates an example of a secondary pane of a graphical user interface that enables a user to execute a sell with a market order, in accordance with embodiments of the present disclosure;

FIG. 20 illustrates an example of a secondary pane of a graphical user interface that enables a user to execute a buy with a trailing stop limit order, in accordance with embodiments of the present disclosure;

FIG. 26 illustrates an example of a secondary pane of a graphical user interface that enables a user to buy an option call to open, in accordance with embodiments of the present disclosure;

FIG. 27 illustrates an example of a secondary pane of a graphical user interface that enables a user to buy a mutual fund, in accordance with embodiments of the present disclosure;

FIG. 31 illustrates an example of a secondary pane of a graphical user interface that enables an exchange of funds into a selected mutual fund from another mutual fund, in accordance with embodiments of the present disclosure;

FIG. 35 illustrates an example of a secondary pane of a graphical user interface where the user has clicked on a Preview button, in accordance with embodiments of the present disclosure.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
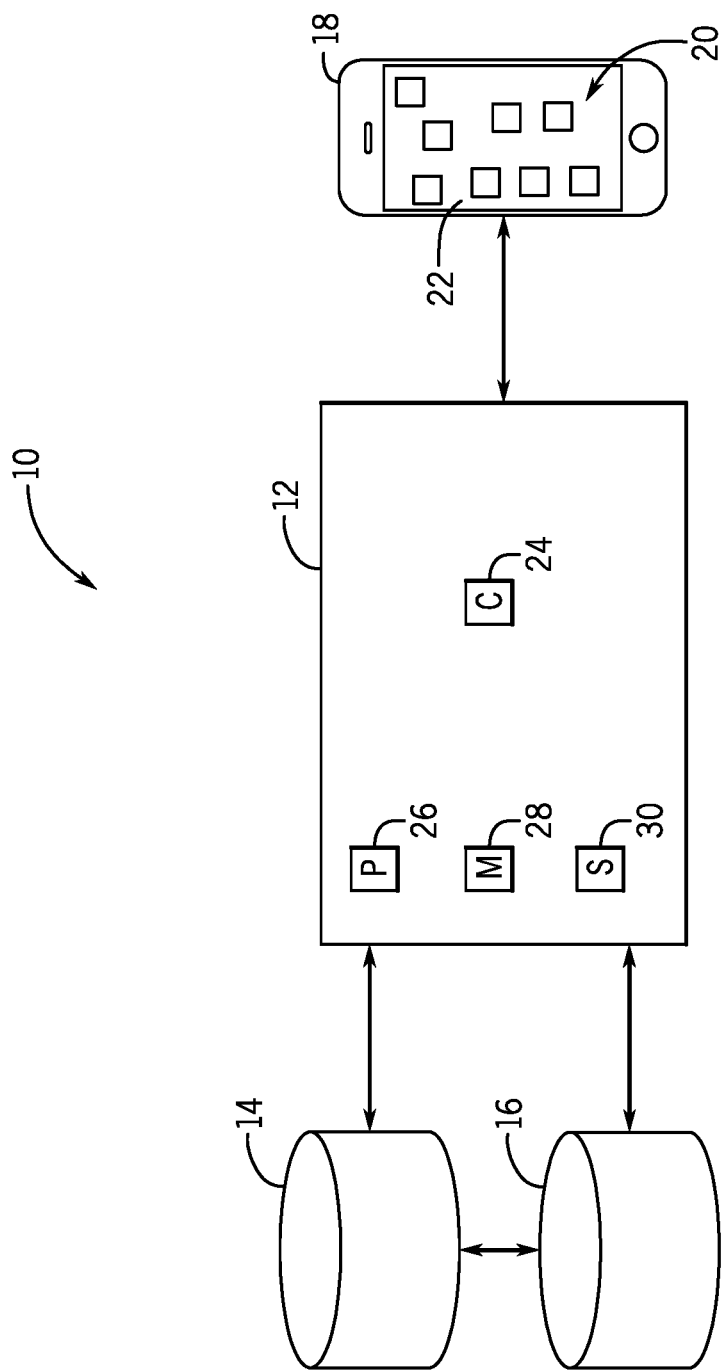
FIG. 1 is a block diagram of a system having a user interface generation system that is configured to provide a graphical user interface, in accordance with embodiments of the present disclosure.

FIG. 1 is a block diagram of an embodiment of a system 10 (e.g., a user interface system) that is configured to provide a graphical user interface to a user, in accordance with embodiments of the present disclosure. As shown, the system 10 includes a user interface generation system 12 configured to communicate with a financial trading system 14, which in turn is configured to communicate with one or more financial markets 16 such that the financial trading system 14 facilitates financial trading via the user interface generation system 12. However, in certain embodiments, the user interface generation system 12 may also, or alternatively, be configured to communicate directly with the one or more financial markets 16.

The user interface generation system 12, in certain embodiments, may include one or more computers that may be connected through a real-time communication network, such as the Internet. In one embodiment, analysis or processing operations may be distributed over the computers that make up the user interface generation system 12. The user interface generation system 12 may receive information from various sources, such as via inputs received from a user computing device 18 or via other computing devices (e.g., servers). While the illustrated user computing device 18 is a mobile phone, it should be appreciated that the system 10 may be utilized to provide the graphical user interfaces 20 on any type of display, which may be associated with any type of electronic or computing device, including a laptop, tablet, computer, wrist watch, or the like.

As described in greater detail herein, the user interface generation system 12 may generate graphical user interfaces 20 that are displayed on a display 22 of the user computing device 18, and which facilitate financial trading via the financial trading system 14, for example, based on user inputs received via the graphical user interfaces 20. For example, in certain embodiments, the financial trading system 14 selectively provides trade data in response to a user request to execute a trade of a financial instrument. In certain embodiments, the trade data includes a type of trade (e.g., buy, sell, and so forth), a type of a financial instrument to be traded (e.g., stock, bond, option, and so forth), a company underlying a stock, for example, an amount of shares to be traded, a price (or range of prices) the shares are to be traded at, a time/date that the trade is to be executed, and/or any other appropriate data. In certain embodiments, the trade data is transmitted (e.g., over a network) to the one or more financial markets 16, which handle the particular financial instrument to be traded, and execute the trade based on the trade data.

In operation, the user interface generation system 12 is configured to generate the graphical user interfaces 20 that are displayed on the display 22 of the user computing device 18. In certain embodiments, the graphical user interfaces 20 facilitate directed investing decisions by, for example, presenting to users only options that are relevant to the particular user's account. Furthermore, in certain embodiments, the graphical user interfaces 20 may notify users of particular problems relating to a particular trade immediately by, for example, presenting a notification inline (e.g., with respect to a series of selected options via the graphical user interface 20) as opposed to, for example, notifying the user of the particular problem on a subsequently displayed page. Doing so not only reduces frustration for the user, but also accelerates execution of the particular trade, thereby ensuring the financial opportunities are not lost to the user.

The user interface generation system 12 may include certain components to facilitate these actions. As illustrated, in certain embodiments, the user interface generation system 12 may include a communication component 24, a processor 26, a memory 28, and a storage 30, or any of a variety of other components that enable the user interface generation system 12 to carry out the techniques described herein. The communication component 24 may be a wireless or wired communication component that may facilitate communication with the user computing device 18, the financial trading system 14, and other devices or systems.

The processor 26 may be any suitable type of computer processor or microprocessor capable of executing computer-executable code. The processor 26 may also include multiple processors that may perform the operations described herein. The memory 28 and the storage 30 may be any suitable articles of manufacture that can serve as media to store processor-executable code, data, or the like. These articles of manufacture may represent computer-readable media (e.g., any suitable form of memory or storage) that may store the processor-executable code used by the processor 26 to perform the presently disclosed techniques. The memory 28 and the storage 30 may also be used to store the data, various other software applications, and the like. The memory 28 and the storage 30 may represent non-transitory computer-readable media (e.g., any suitable form of memory or storage) that may store the processor-executable code used by the processor 26 to perform various techniques described herein. It should be noted that non-transitory merely indicates that the media is tangible and not a signal.

It should be noted that the components described above with regard to the user interface generation system 12 are exemplary components, and the user interface generation system 12 may include additional or fewer components in certain embodiments. Additionally, it should be noted that the user computing device 18 may also include similar components as described as part of the user interface generation system 12 (e.g., respective communication devices, processors, memories, storage), as well as a display, to facilitate the disclosed operation of the system 10.

Figure 2:
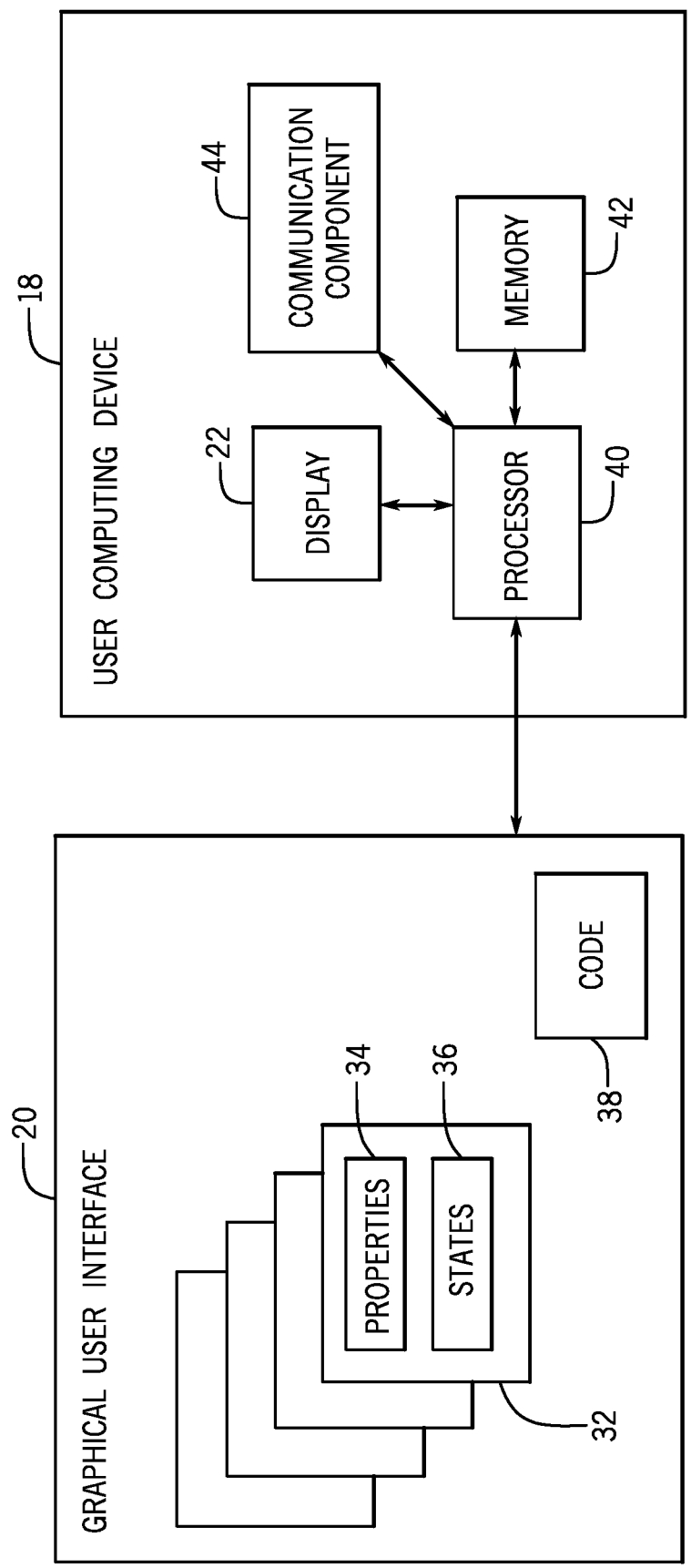
FIG. 2 is an architectural view of an example graphical user interface having a plurality of encapsulated components, in accordance with embodiments of the present disclosure.

As described in greater detail herein, in certain embodiments, the graphical user interface 20 may be generated by the user interface generation system 12 as a web-based application comprising a plurality of encapsulated components 32 that, for example, are configured with their own specific properties 34 and states 36, and the graphical user interface 20 is configured to be updated and rendered whenever properties 34 and/or states 36 of the plurality of encapsulated components 32 changes. FIG. 2 is an architectural view of an example graphical user interface 20 having a plurality of encapsulated components 32, in accordance with embodiments of the present disclosure. As illustrated in FIG. 2, in certain embodiments, the graphical user interface 20 may include executable code 38 embedded therein, wherein the executable code 38 (e.g., JavaScript-based, or other comparable code) may be executed by a processor 40 of the user computing device 18 while the graphical user interface 20 is displayed on the display 22 (e.g., screen) of the user computing device 18. It will be appreciated that the user computing device 18 may also include a memory 42 configured to store data on the user computing device 18, for example, data relating to interactions with the graphical user interface 20 described herein.

For example, in certain situations, when a change in a property 34 and/or a state 36 of an encapsulated component occurs, the executable code 38 of the graphical user interface 20 may locally determine updated properties 34 and/or states 36 for the plurality of encapsulated components 32 of the graphical user interface 20, new encapsulated components 32 to add to the graphical user interface 20, encapsulated components 32 that should be removed from the graphical user interface 20, and so forth. However, in other situations, when a change in a property 34 and/or a state 36 of an encapsulated component 32 occurs, the executable code 38 of the graphical user interface 20 may determine whether the change in the property 34 and/or the state 36 may necessitate communication back to the user interface generation system 12 (e.g., via a communication component 44 of the user computing device 18) to facilitate the user interface generation system 12 determining updated properties 34 and/or states 36 for the plurality of encapsulated components 32 of the graphical user interface 20, new encapsulated components 32 to add to the graphical user interface 20, encapsulated components 32 that should be removed from the graphical user interface 20, and so forth. For example, in such situations, the user interface generation system 12 may need to communicate with a financial trading system 14 or, alternatively, directly to one or more financial markets 16 to determine certain data (e.g., price quotes, and so forth) to be used to update the encapsulated components 32 of the graphical user interface 20. In other embodiments, the graphical user interface 20 may include certain encapsulated components 32 that are configured to directly communicate with a financial trading system 14 and/or one or more financial markets 16 (e.g., via the communication component 44 of the user computing device 18), and the executable code 38 of the graphical user interface 20 may update and render the encapsulated components 32 based on the direct communication with the financial trading system 14 and/or one or more financial markets 16. In certain embodiments, such direct interaction with external data sources, such as the financial trading system 14 and the one or more financial markets 16) may be implemented by the executable code 38 of the graphical user interface 20 using representational state transfer techniques.

As such, the executable code 38 of the graphical user interface 20 may be configured to automatically update and render the graphical user interface 20 based on inputs received by the executable code 38 via the plurality of encapsulated components 32, for example, without the need to load entirely new views via the graphical user interface 20. As such, as opposed to conventional graphical user interfaces, the graphical user interface 20 described herein facilitates real-time feedback to the user via the graphical user interface 20. For example, the encapsulated components 32 of the graphical user interface 20 may be rendered based on the inputs that are received from the encapsulated components 32 such that the user perceives that the graphical user interface 20 is building a summary of the interactions via the graphical user interface 20 inline with the rendered components 32 of the graphical user interface 20. This functionality of the graphical user interface 20 may, for example, provide the user with real-time feedback regarding certain problems that exist with respect to certain options that are selected by the user via the graphical user interface 20, solutions to such problems and suggestions for addressing such problems, and so forth.

Figure 3A:
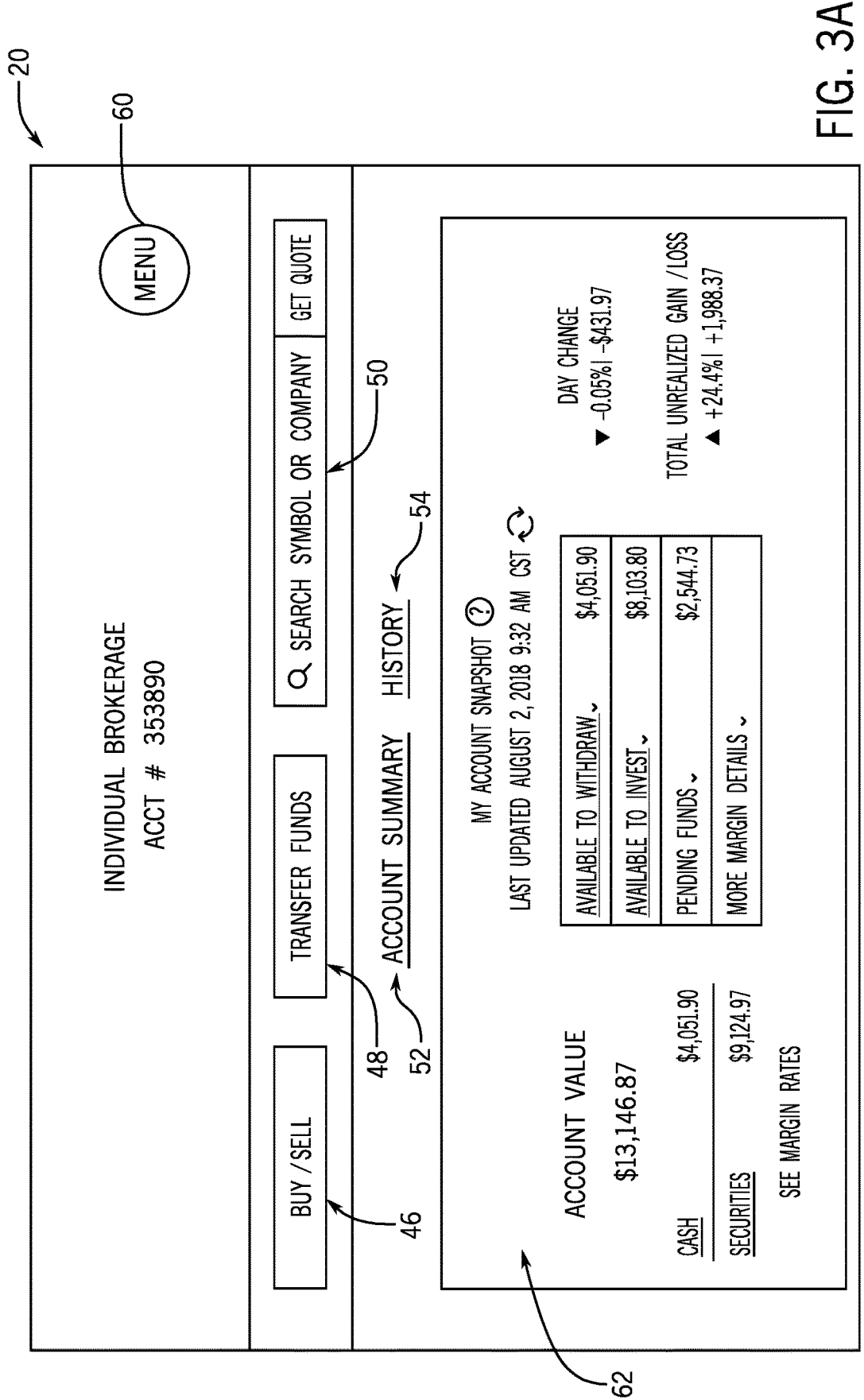
FIGS. 3A and 3B illustrate an example of a graphical user interface that may be generated by the user interface generation system, in accordance with embodiments of the present disclosure.
Figure 3B:

FIGS. 3A and 3B illustrate an example of a graphical user interface 20 that may be generated by the user interface generation system 12, in accordance with embodiments of the present disclosure. The graphical user interface 20 is displayed on the display 22 (e.g., screen) of the user computing device 18. As illustrated, in certain embodiments, the graphical user interface 20 may include a plurality of encapsulated components 32 that include, but are not limited to, a Buy/Sell button 46, a Transfer Funds button 48, a Symbol/Company search box 50 that facilitates receiving quotes for particular stocks, mutual funds, and so forth, an Account Summary link 52, and a History link 54. In certain embodiments, the Symbol/Company search box 50 enables the user to type in security name or symbol, and a predictive search populates a drop-down list of results based on the entered security or symbol. The user may then tap on the particular security that is desired to select that security.

The view of the graphical user interface 20 illustrated in FIG. 3A displays a My Account Snapshot, which a total Account Value for a particular account (e.g., account number 353890 in the illustrated view), which may be broken out into totals for Cash and Securities, an Available to Withdraw amount, an Available to Invest amount, a Pending Funds amount, a link to view More Margin Details, a Day Change for the particular account, and a Total Unrealized Gain/Loss for the particular account. The view of the graphical user interface 20 illustrated in FIG. 3A may be accessed by clicking on the Account Summary link 52. In addition, FIG. 3B illustrates the remainder of the view illustrated in FIG. 3A when the user scrolls down within the graphical user interface 20. As illustrated, in certain embodiments, the lower portion of the graphical user interface 20 illustrated in FIG. 3B may display the current various Positions of the particular account. For example, the individual Stocks/ETFs (Exchange-Traded Funds), Mutual Funds, and Cash positions may each be listed in their respective categories, with the number of Shares, Price of the shares, a Change, a Day Gain/Loss, Unrealized Gain/Loss, and total Value for the particular position shown.

Figure 4:
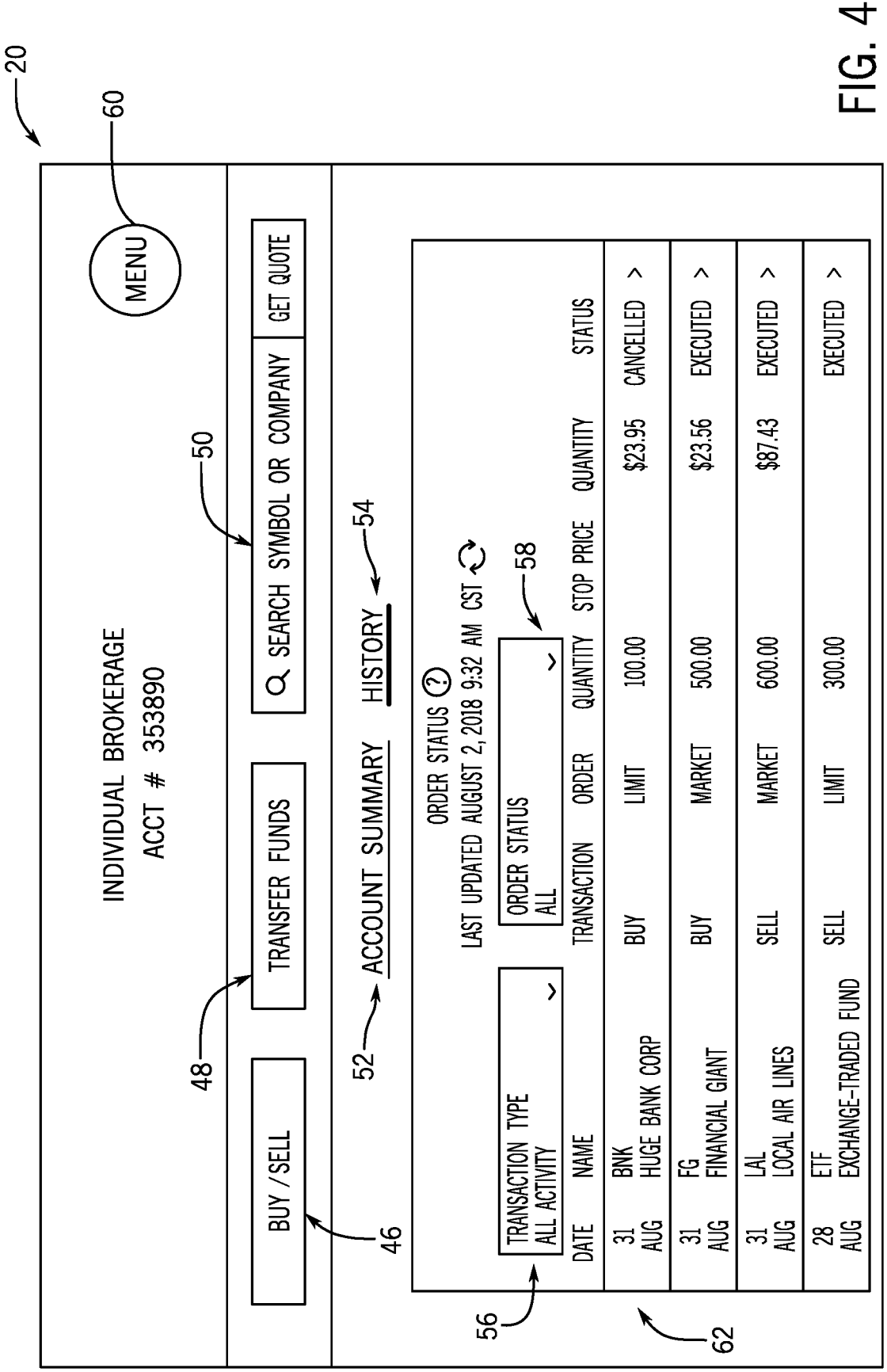
FIG. 4 illustrates another example of a graphical user interface that may be generated by the user interface generation system, in accordance with embodiments of the present disclosure.

FIG. 4 illustrates another example of a graphical user interface 20 that may be generated by the user interface generation system 12, in accordance with embodiments of the present disclosure. In particular, when the user clicks on the History link 54, the view of the graphical user interface 20 illustrated in FIG. 4 may be displayed, which is an Order Status view that lists all financial trades that have been executed for the particular account. As illustrated, for each financial trade, the Date of the financial trade, Name of the stock, mutual fund, option, etc., type of Transaction, type of Order, Quantity, Stop Price (if relevant), Limit Price (if relevant), and Status may be shown. In addition, in certain embodiments, in the view illustrated in FIG. 4 of the graphical user interface 20, a Transaction Type filter 56 and an Order Status filter 58 may be shown to enable the user to filter the financial trades based on those criteria. It will be appreciated that, in other embodiments, additional or alternative filters relating to any of the information for the financial trades may be provided via the graphical user interface 20.

It is also noted that each of the view of the graphical user interface 20 illustrated in FIGS. 3A and 4 include a Menu button 60. In general, the views of the graphical user interface 20 illustrated in FIGS. 3A and 4 may be characterized as a primary pane 62 of the graphical user interface 20. Whenever the user clicks on the Menu button 60, the Buy/Sell button 46, the Transfer Funds button 48, or executes a search via the Symbol/Company search box 50, a secondary pane 64 may be rendered within the graphical user interface 20. For example, in the embodiment illustrated in FIG. 5, the secondary pane 64 may be rendered as a relatively thin pane to the right of the primary pane 62, which remains displayed via the graphical user interface 20. In the view illustrated in FIG. 5, the secondary pane 64 includes Menu information because the user has opened the secondary pane 64 by clicking on the Menu button 60. However, again, the secondary pane 64 may also be opened by the user by clicking on one of the Buy/Sell button 46, the Transfer Funds button 48, or the Symbol/Company search box 50. Each of those particular views that may be displayed within the secondary pane 64 of the graphical user interface 20 will be discussed in further detail herein.

As illustrated, in certain embodiments, the Menu view of the secondary pane 64 may include a Buy/Sell link 66 and a Transfer Funds link 68, which when clicked, initiate the same functionality as the Buy/Sell button 46 and the Transfer Funds button 48, respectively. In addition, in certain embodiments, the Menu view of the secondary pane 64 may also include a Switch Accounts combo box 70, which enables the user to switch between multiple accounts, a Nickname for the currently selected account, an Account Type for the currently selected account, an Account Number of the currently selected account, an Account Registration combo box 72, which enables the user to register an account, and a Beneficiaries combo box 74, which enables the user to add and/or change beneficiaries for a particular account.

In addition, in certain embodiments, the Menu view of the secondary pane 64 may include various links to investment information (i.e., under a heading of Investment Center), such as News and Research, View Markets Insights, See All Funds, and Tools and Calculators. In addition, the in certain embodiments, the Menu view of the secondary pane 64 may include various links to other financial functionality related to a particular account (i.e., under a heading of Account Services), such as Go to Account Documents, Manage Alert Settings, Start an IRA Withdrawal, Transfer an Account, Set Up Automatic Investing, Reinvest Dividends, and Download All My Accounts. It will be appreciated that the links under the headings of Investment Center and Account Services illustrated in FIG. 5 are merely exemplary, and are not intended to be limiting.

Figure 5:
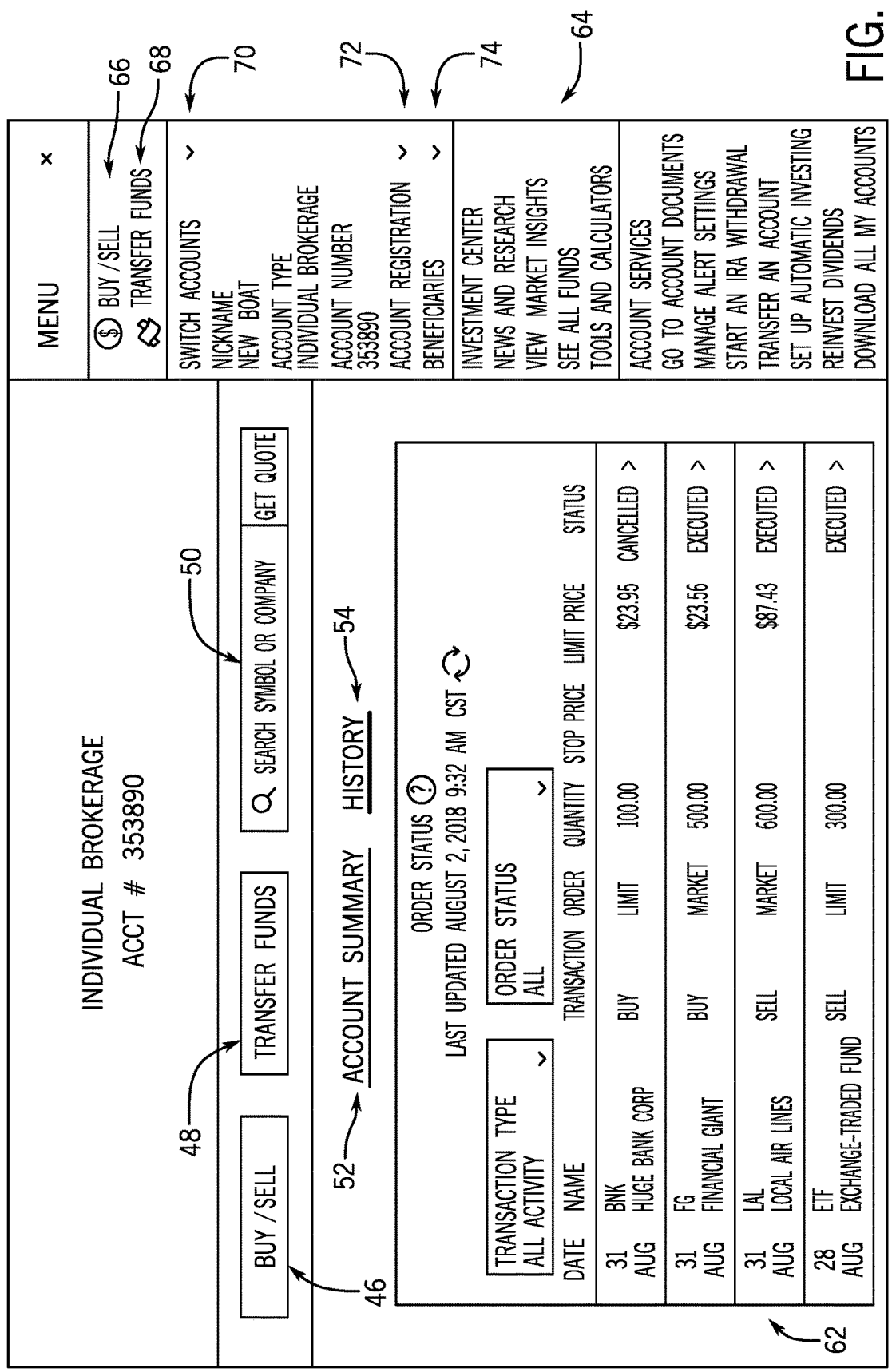
FIG. 5 illustrates an example of a graphical user interface that includes a primary pane and a secondary pane, in accordance with embodiments of the present disclosure.
Figure 6:
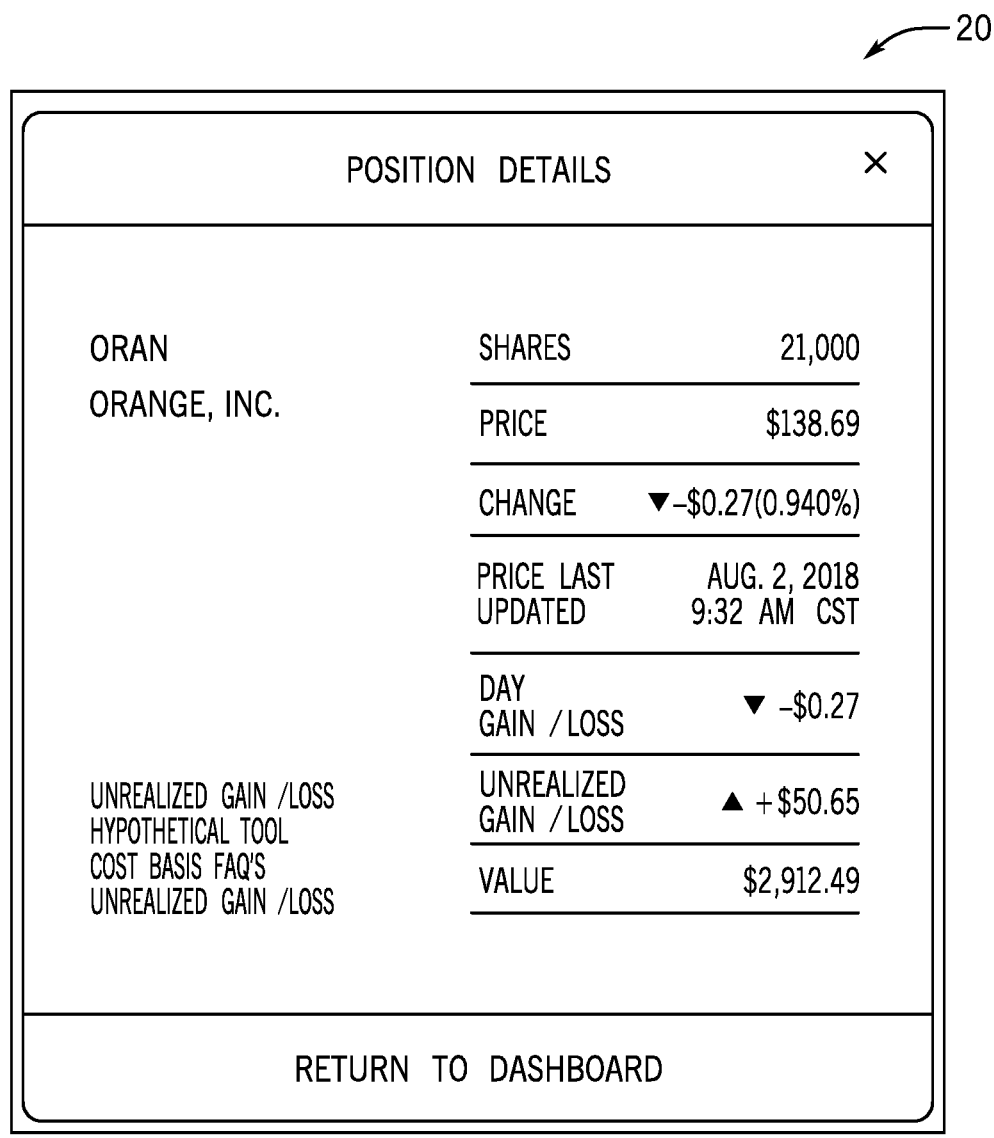
FIG. 6 illustrates an example of a graphical user interface that includes a primary pane and a secondary pane that are displayed separately, in accordance with embodiments of the present disclosure.

The embodiment illustrated in FIG. 5, where the secondary pane 64 is rendered to the right of the primary pane 62 within the graphical user interface 20, may be particularly useful when the user computing device 18 includes a relatively larger display 22, such as a personal or laptop computer. However, in certain embodiments, where the user computing device 18 includes a relatively smaller display 22, such as on a mobile phone, the primary pane 62 and the secondary pane 64 may be rendered separately within the graphical user interface 20, and the user may toggle back and forth between the primary pane 62 and the secondary pane 64. For example, FIG. 6 illustrates an example of a graphical user interface 20 that includes a primary pane 62 and a secondary pane 64 that are displayed separately, in accordance with embodiments of the present disclosure. In particular, FIG. 6 illustrates when the primary pane 62 is the pane that is currently being displayed via the graphical user interface 20. It will be appreciated that the particular view of the graphical user interface 20 illustrated in FIG. 6 is analogous to the view illustrated in FIG. 3B.

The embodiments of graphical user interfaces 20 described herein include a primary pane 62 and/or a secondary pane 64 having components 32 encapsulated therein, which enable the graphical user interfaces 20 to build the primary pane 62 and/or the secondary pane 64 to be built while the user is interacting with the particular graphical user interface 20 while the user is selecting options via the encapsulated components 32. This functionality enables the graphical user interfaces 20 described herein to instantaneously respond to the inputs received from the user via the encapsulated components 32, for example, without the need to proceed to another page or even another view area of the graphical user interface 20. Rather, the graphical user interfaces 20 described herein may add and/or subtract certain encapsulated components 32 inline (e.g., seemingly adding and/or subtracting from a natural progression of inputs, for example, in a columnar view). This functionality of the graphical user interfaces 20 described herein provides users with more guided direction, thereby encouraging the users to proceed with more self-directed decisions relating to financial trades executed via the graphical user interfaces 20. For example, in certain embodiments, the graphical user interfaces 20 described herein may only present options that are only relevant for a particular user and/or for a particular financial trade (e.g., based on previous inputs received via the graphical user interface 20). In addition, in certain embodiments, the graphical user interfaces 20 described herein may present user-friendly error messages and, indeed, guide the user by presenting potential corrective actions for the related error, when the user inputs information that does not make sense, or is infeasible, based on previous inputs received via the graphical user interface 20. Furthermore, in certain embodiments, the graphical user interfaces 20 described herein may present helpful tips that may be relevant to the user based on previous inputs received via the graphical user interface 20.

Figure 7:
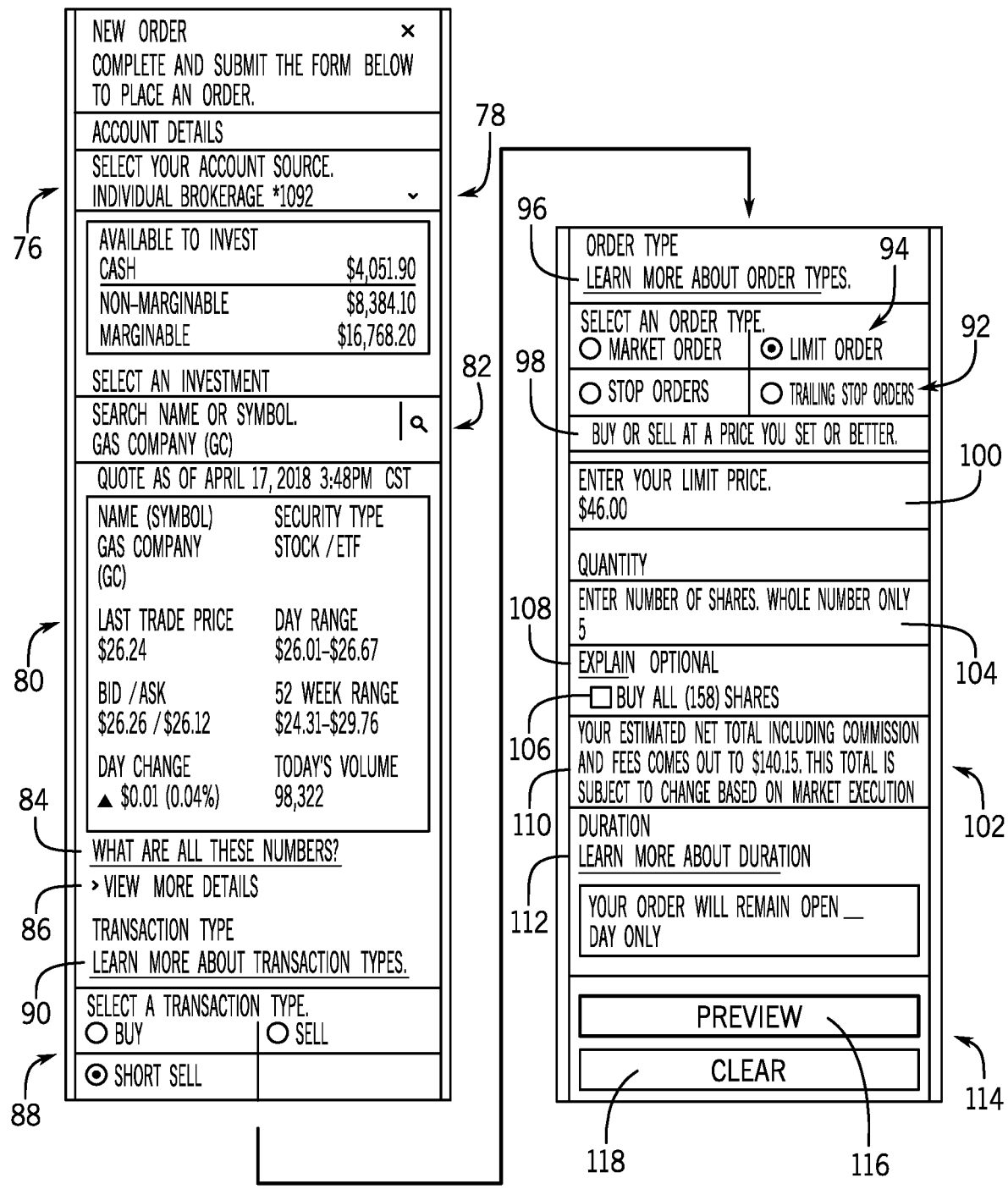
FIG. 7 illustrates an example of a secondary pane of a graphical user interface that enables a user to execute a short sell with a limit order, in accordance with embodiments of the present disclosure.

FIGS. 7 through 36 illustrate views of the secondary pane 64 of the graphical user interface 20 to show how certain encapsulated components 32 may be added and/or subtracted to the secondary pane 64 to build up various sections of the secondary pane 64 based on inputs received via the graphical user interface 20, in accordance with embodiments of the present disclosure. For example, FIG. 7 illustrates an example of a secondary pane 64 of a graphical user interface 20 that enables a user to execute a short sell with a limit order, in accordance with embodiments of the present disclosure. The secondary pane 64 illustrated in FIG. 7 may, for example, have been launched by the user by executing a search via the Symbol/Company search box 50 of the primary pane 62. As illustrated in FIG. 7, in certain embodiments, the secondary pane 64 may include an Account Details section 76, which may be rendered at the top of the secondary pane 64. As illustrated, in certain embodiments, the Account Details section 76 may display current Cash, Non-Marginable, and Marginable account values for a particular brokerage account, and may enable the user changing to a different brokerage account via a drop-down menu 78.

As illustrated in FIG. 7, the next section of the secondary pane 64 rendered by the graphical user interface 20 may be a Search Results section 80 that enables the user to update the search criteria via a search box 82 that is substantially similar to the Symbol/Company search box 50 of the primary pane 62. As illustrated, the Search Results section 80 may display certain information, such as the Name (Symbol), Security Type, Last Trade Price, Day Range of the price, Bid and Ask prices, 52 Week Range of the price, Day Change in the price, and Today's volume, for the currently selected financial security. In the interest of guiding the user, in certain embodiments, the Search Results section 80 of the secondary pane 64 may also include a link 84 (e.g., "What are all these numbers?), which may be clicked by the user to, for example, provide more information via the secondary pane 64 relating to the significance of all of the various numbers presented in the Search Results section 80. In addition, in certain embodiments, the Search Results section 80 of the secondary pane 64 may also include a View More Details link 86, which may be clicked by the user to, for example, provide more information relating to the currently selected financial security.

In addition, in certain embodiments, based at least in part on the type of the currently selected financial security, the Search Results section 80 of the secondary pane 64 may include a series of Transaction Type options 88 (e.g., Buy, Sell, Short Sell, and so forth), which may be selected by the user based on the type of financial trade desired by the user.

In the interest of guiding the user, in certain embodiments, the Search Results section 80 of the secondary pane 64 may also include a link 90 (e.g., "Learn more about transaction types"), which may be clicked by the user to, for example, provide more information via the secondary pane 64 relating to the various transaction types.

In certain embodiments, when the user selects Short Sell via the Transaction Type options 88, a new Order Type section 92 of the secondary pane 64 may be rendered just underneath the Search Results section 80, which may include a series of Order Type options 94 (e.g., Market Order, Limit Order, Stop Orders, Trailing Stop Orders, and so forth), which may be selected by the user based on the type of order desired by the user. In the interest of guiding the user, in certain embodiments, the Order Type section 92 of the secondary pane 64 may also include a link 96 (e.g., "Learn more about order types"), which may be clicked by the user to, for example, provide more information via the secondary pane 64 relating to the various order types. In addition, in certain embodiments, the Order Type section 92 of the secondary pane 64 may include a helpful hint 98 relating to the currently selected Order Type, such as "Buy or sell at a price you set or better" when the user has selected Limit Order via the Order Type options 94. In addition, in certain embodiments, when the user has selected Limit Order via the Order Type options 94, the Order Type section 92 of the secondary pane 64 may include an input box 100 into which the user may enter a limit order price.

In addition, in certain embodiments, when the user selects Limit Order via the Order Type options 94, a new Quantity section 102 of the secondary pane 64 may be rendered just underneath the Order Type section 92, which may include an input box 104 into which the user may enter a number of shares for the short sell limit order. In addition, in certain embodiments, the Quantity section 102 may include an optional check box 106 that enables the user to alternatively select a "Buy all (#) shares" option. In the interest of guiding the user, in certain embodiments, the Quantity section 102 of the secondary pane 64 may also include links 108 (e.g., "Explain"), which may be clicked by the user to, for example, provide more information relating to this option. In addition, in certain embodiments, the Quantity section 102 of the secondary pane 64 may also include a helpful hint 110 relating to the short sell limit order, such as the estimated net total including commissions and fees, and that the estimated net total may be subject to change based on market execution.

In addition, as illustrated in FIG. 7, in certain embodiments, the Duration of the short sell limit order may default to be for a Day Only, and the Quantity section 102 of the secondary pane 64 may display this fact. In the interest of guiding the user, in certain embodiments, the Quantity section 102 of the secondary pane 64 may also include a link 112 (e.g., "Learn more about duration"), which may be clicked by the user to, for example, provide more information via the secondary pane 64 relating to the duration of short sell limit orders. Finally, as with any of the financial trades selected by the user via the secondary pane 64, a Preview/Clear section 114 may be rendered underneath all of the other sections of the secondary pane 64. Specifically, a Preview button 116 of the Preview/Clear section 114 may be clicked by the user to preview the results of the financial trade selected by the user, and a Clear button 118 of the Preview/Clear section 114 may be clicked by the user to clear the financial trade selected by the user from the secondary pane 64.

As an alternative to defaulting to having a Duration of a Day Only, in certain embodiments, the Quantity section 102 of the secondary pane 64 may instead include a series of Duration options 120. FIG. 8 illustrates an example of a secondary pane 64 of a graphical user interface 20 that enables a user to execute a sell with a limit order and duration options, in accordance with embodiments of the present disclosure. As such, the financial trade being entered by the user via the secondary pane 64 in FIG. 8 is a sell order (e.g., Sell is selected via the Transaction Type options 88) instead of a short sell, as illustrated in FIG. 7. As illustrated in FIG. 8, in certain embodiments, the Duration options 120 may include Day Only, Good Until Cancelled (180 Days), and so forth). In addition, in certain embodiments, a helpful hint 122 may be added relating to the Duration options 120, such as "Select how long your order will remain open."

In certain embodiments, an Additional Order Selections section 124 may be rendered just before the Preview/Clear section 114 of the secondary pane 64, and may provide users with an opportunity to add additional selections relating to the financial trade being entered. For example, in certain embodiments, a qualifier such as "Do Not Reduce" may be selected via a check box 126. In the interest of guiding the user, in certain embodiments, the Additional Order Selections section 124 of the secondary pane 64 may also include a link 128 (e.g., "Explain"), which may be clicked by the user to, for example, provide more information relating to such qualifiers. In addition, in certain embodiments, a helpful hint 130 relating to such qualifiers may be displayed as well. In addition, in certain embodiments, the user may change a ledger relative to which the financial trade will executed via a series of Ledger options 132 (e.g., Margin Account, Cash Account, and so forth). In the interest of guiding the user, in certain embodiments, the Additional Order Selections section 124 of the secondary pane 64 may also include a link 134 (e.g., "Explain"), which may be clicked by the user to, for example, provide more information relating to changing ledgers. In addition, in certain embodiments, the user may change a tax accounting method via an Accounting Method drop-down menu 136. In the interest of guiding the user, in certain embodiments, the Additional Order Selections section 124 of the secondary pane 64 may also include a link 138 (e.g., "Explain"), which may be clicked by the user to, for example, provide more information relating to the significance of accounting methods. In addition, in certain embodiments, a helpful hint 140 relating to accounting methods may be displayed as well.

Figure 9:
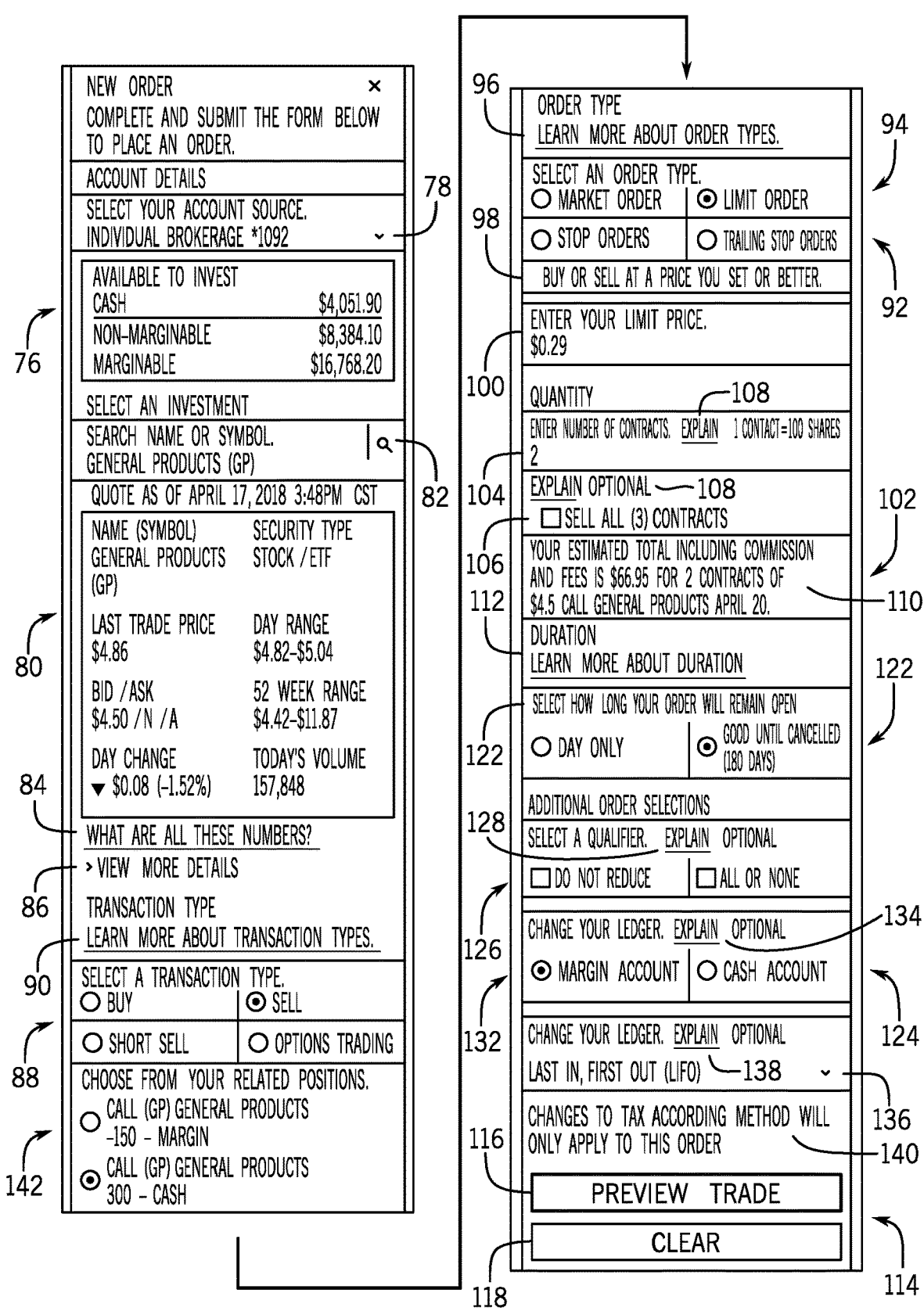
FIG. 9 illustrates an example of a secondary pane of a graphical user interface that enables a user to execute a sell of one of multiple positions for an account, in accordance with embodiments of the present disclosure.

Sometimes, when the user selects Sell from the Transaction Type options 88, the specific account that is selected may have multiple positions that would be appropriate for the user to sell. FIG. 9 illustrates an example of a secondary pane 64 of a graphical user interface 20 that enables a user to execute a sell of one of multiple positions for an account, in accordance with embodiments of the present disclosure. In the illustrated embodiment, when the user selects a particular security to sell, the account may have multiple positions relating to the particular security. When this happens, a series of Position options 142 may be presented in the Search Results section 80, which enable the user to select a particular position to sell. Once the user selects a particular position via the Position options 142, the secondary pane 64 may continue being generated (e.g., to display the Order Type section 92, Quantity section 102, Additional Order Selections section 124, Preview/Clear section 114, and so forth, as described above).

Sometimes, when a user makes a selection via the secondary pane 64, the selections may generate an error. As opposed to conventional techniques where the error may not be generated until the user submits a completed order, the embodiments described herein generate and display errors inline with respect to the secondary pane 64. For example, in certain embodiments, an error message may be displayed directly under the encapsulated component 32 that generated the error. For example, FIG. 10 illustrates an example of a secondary pane 64 of a graphical user interface 20 that has generated an error message, in accordance with embodiments of the present disclosure. As illustrated, the user has selected Buy from the Transaction Type options 88, and selected Market Order from the Order Type options 94. However, in certain embodiments, when the user entered a number of shares to sell from the input box 104, an error message 144 may be generated that notifies the user that the estimated trade amount exceeds available funds for the particular account. In addition, the error message 144 may provide helpful hints relating to corrective actions, such as reducing the trade amount, transferring funds to the particular account, including providing a link 146 to transfer the funds, and so forth. In addition, in certain embodiments, a visual indicator 148 (e.g., a red mark or some other indicator) of the error may be displayed proximate the encapsulated component 32 that generated the error (e.g., the input box 104 relating to number of shares, in the illustrated view).

Figure 11:
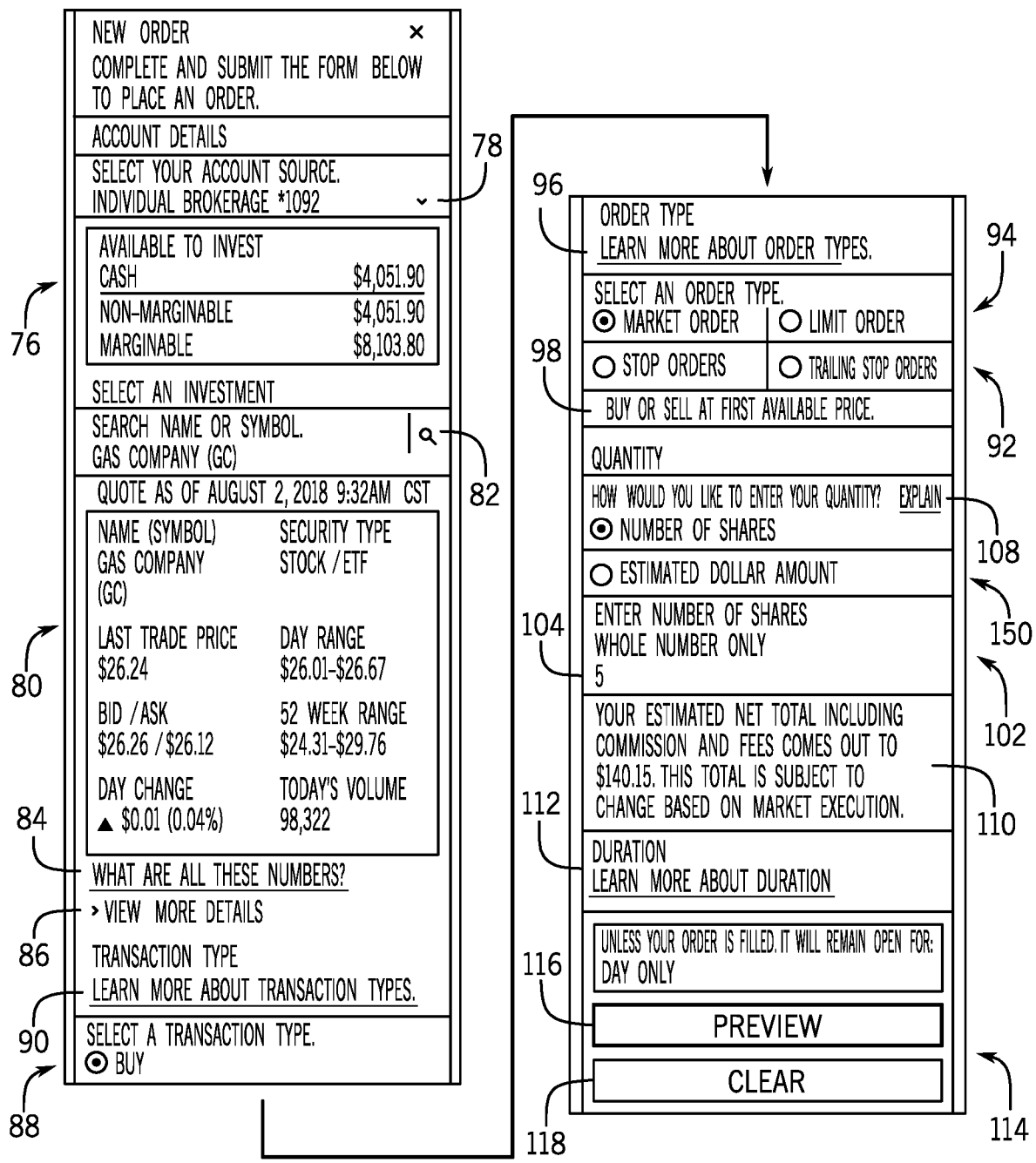
FIG. 11 illustrates an example of a secondary pane of a graphical user interface that enables a user to execute a buy with a market order, in accordance with embodiments of the present disclosure.

The remainder of the figures described herein will illustrate the various type of financial trades that are facilitated by the embodiments described herein. For example, FIG. 11 illustrates an example of a secondary pane 64 of a graphical user interface 20 that enables a user to execute a buy with a market order, in accordance with embodiments of the present disclosure. As illustrated, the user has selected Buy from the Transaction Type options 88, and selected Market Order from the Order Type options 94. In the embodiment illustrated in FIG. 11, instead of simply presenting the input box 104 relating to a number of shares to be entered by the user, the Quantity section 102 of the secondary pane 64 of the graphical user interface 20 may include a series of Quantity options 150 (e.g., Number of Shares, Estimated Dollar Amount, and so forth), which enables the user to buy either a selected number of shares, or to buy an amount of shares for a selected dollar amount. As illustrated, when the Number of Shares option is selected, the input box 104 will accept a Number of Shares entry, and the secondary pane 64 may continue with the financial trade accordingly.

Figure 12:
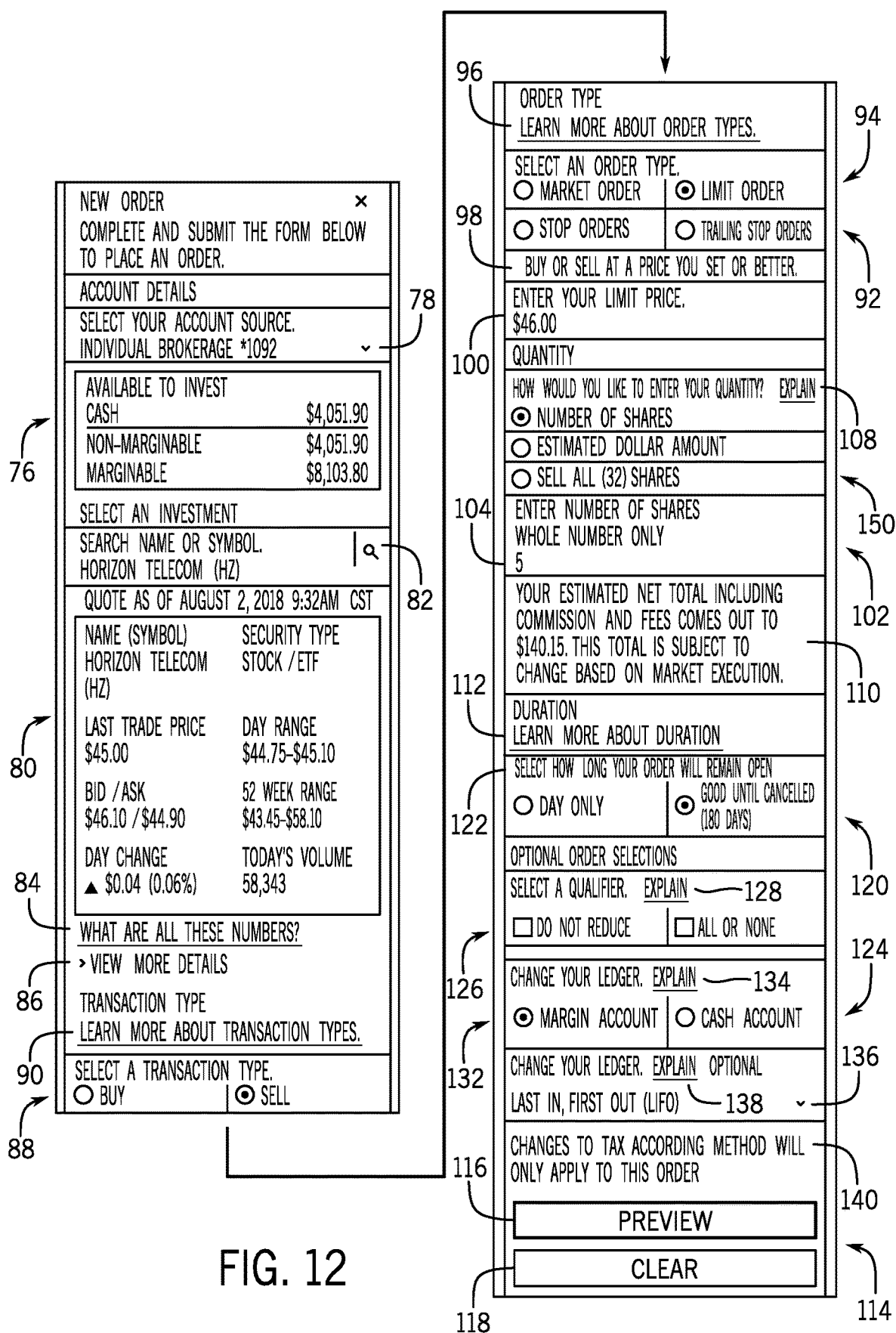
FIG. 12 illustrates an example of a secondary pane of a graphical user interface that enables a user to execute a sell with a limit order, in accordance with embodiments of the present disclosure.

FIG. 12 illustrates an example of a secondary pane 64 of a graphical user interface 20 that enables a user to execute a sell with a limit order, in accordance with embodiments of the present disclosure. As illustrated, the user has selected Sell from the Transaction Type options 88, and selected Limit Order from the Order Type options 94. Again, as illustrated in FIG. 12, in certain embodiments, the Quantity section 102 of the secondary pane 64 of the graphical user interface 20 may include a series of Quantity options 150 (e.g., Number of Shares, Estimated Dollar Amount, Sell All (X) Shares, and so forth), which enables the user to sell a selected number of shares, to sell an amount of shares for a selected dollar amount, or to sell all shares currently owned. As illustrated, when the Number of Shares option is selected, the input box 104 will accept a Number of Shares entry, and the secondary pane 64 may continue with the financial trade accordingly.

Figure 13:
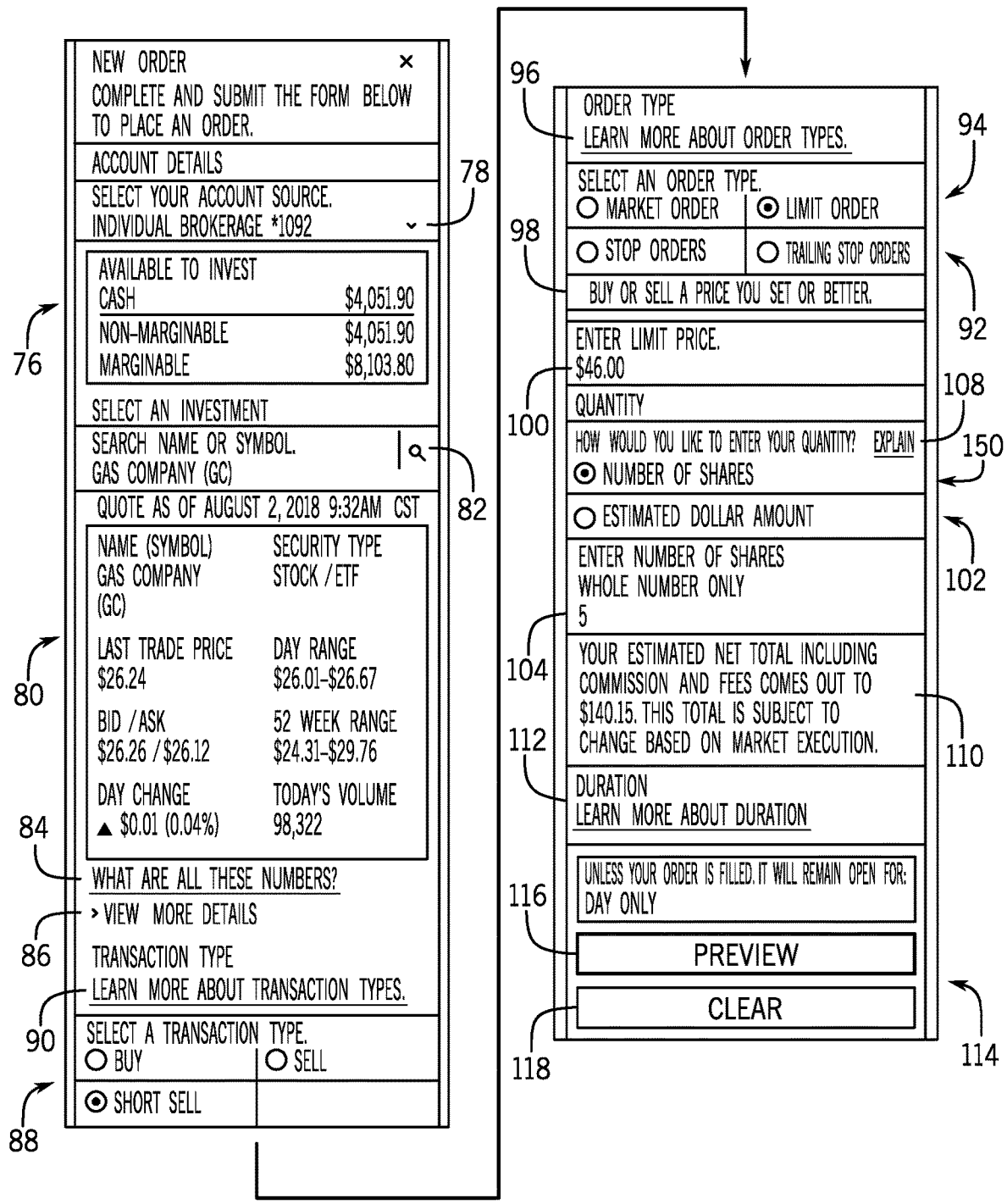
FIG. 13 illustrates an example of a secondary pane of a graphical user interface that enables a user to execute a short sell with a limit order, in accordance with embodiments of the present disclosure.

FIG. 13 illustrates an example of a secondary pane 64 of a graphical user interface 20 that enables a user to execute a short sell with a limit order, in accordance with embodiments of the present disclosure. As illustrated, the user has selected Short Sell from the Transaction Type options 88, and selected Limit Order from the Order Type options 94.

Figure 14:
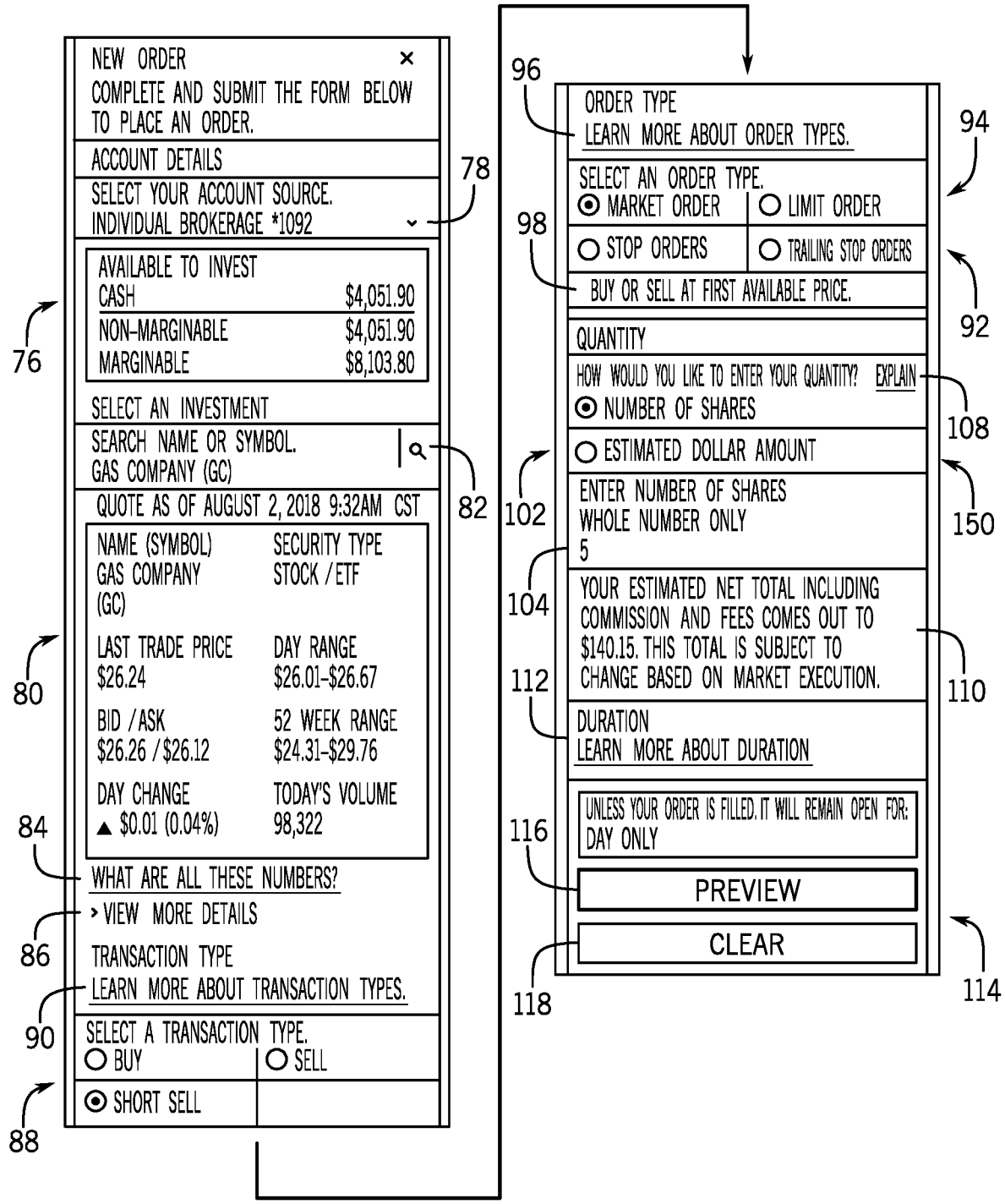
FIG. 14 illustrates an example of a secondary pane of a graphical user interface that enables a user to execute a short sell with a market order, in accordance with embodiments of the present disclosure.

FIG. 14 illustrates an example of a secondary pane 64 of a graphical user interface 20 that enables a user to execute a short sell with a market order, in accordance with embodiments of the present disclosure. As illustrated, the user has selected Short Sell from the Transaction Type options 88, and selected Market Order from the Order Type options 94.

Figure 15:
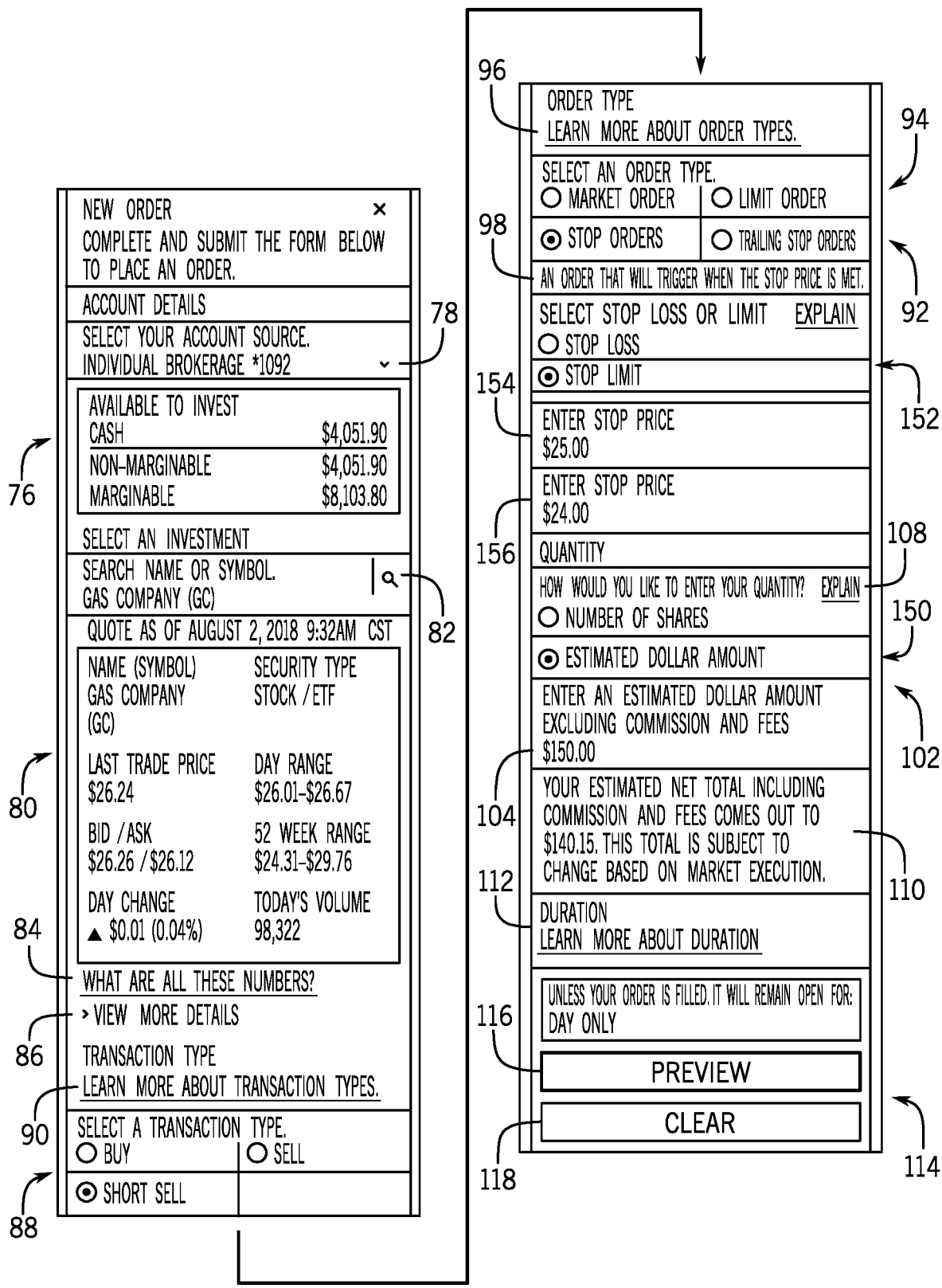
FIG. 15 illustrates an example of a secondary pane of a graphical user interface that enables a user to execute a short sell with a stop limit order, in accordance with embodiments of the present disclosure.

FIG. 15 illustrates an example of a secondary pane 64 of a graphical user interface 20 that enables a user to execute a short sell with a stop limit order, in accordance with embodiments of the present disclosure. As illustrated, the user has selected Short Sell from the Transaction Type options 88, and selected Stop Orders from the Order Type options 94. As also illustrated, when the user has selected these options, in certain embodiments, the Order Type section 92 of the secondary pane 64 may include a series of Stop Loss or Limit options 152 (e.g., Stop Loss, Stop Limit, and so forth), which may be selected by the user based on the type of stop order desired by the user. In addition, in certain embodiments, the Order Type section 92 of the secondary pane 64 may include a first input box 154 into which the user may enter a Stop Price, and a second input box 156 into which the user may enter a Limit Price. FIG. 15 illustrates a short sell where the user has selected Stop Limit from the Stop Loss or Limit options 152.

Figure 16:
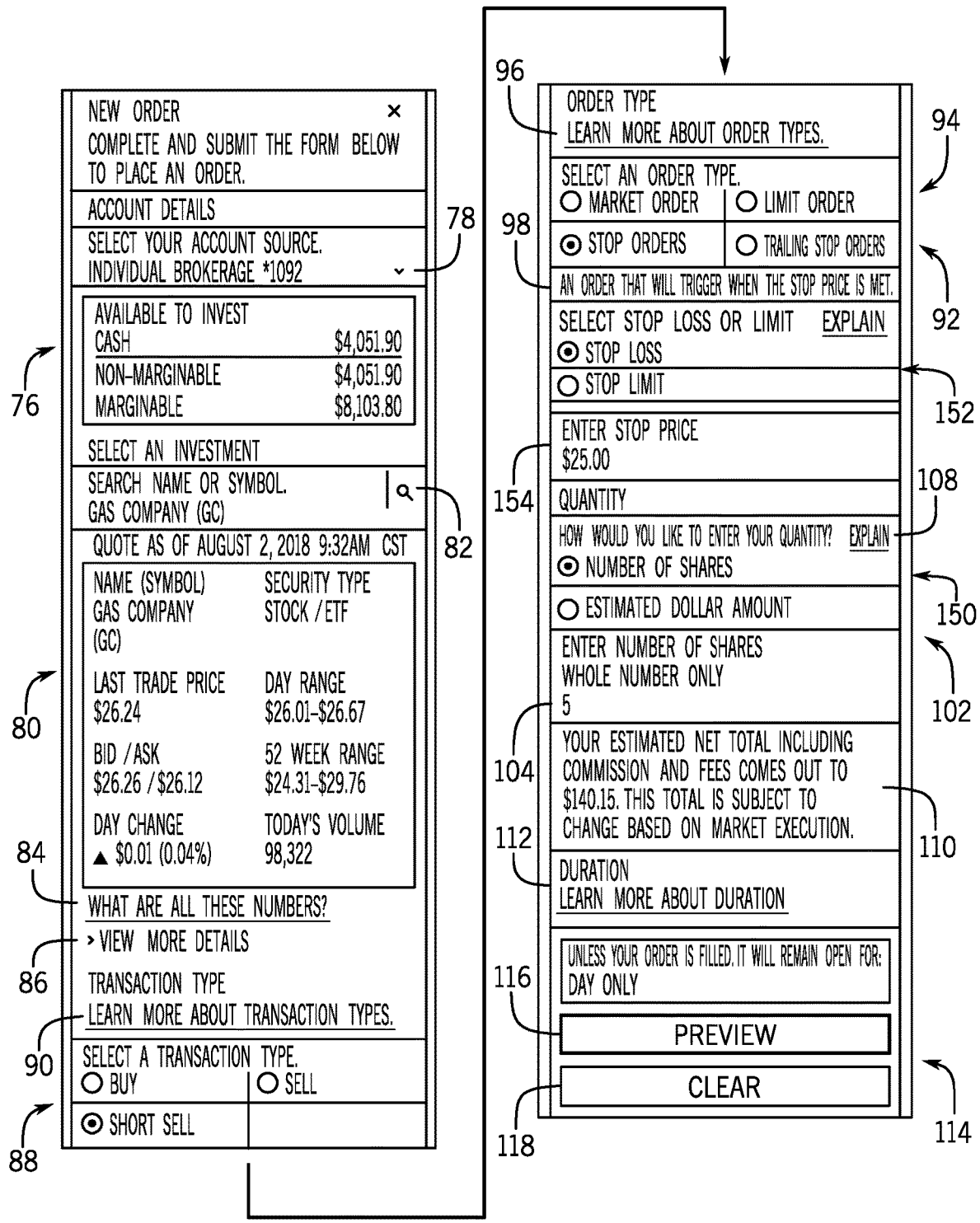
FIG. 16 illustrates an example of a secondary pane of a graphical user interface that enables a user to execute a short sell with a stop loss order, in accordance with embodiments of the present disclosure.

FIG. 16 illustrates an example of a secondary pane 64 of a graphical user interface 20 that enables a user to execute a short sell with a stop loss order, in accordance with embodiments of the present disclosure. As illustrated, the user has again selected Short Sell from the Transaction Type options 88, and selected Stop Orders from the Order Type options 94. However, as opposed to FIG. 15, FIG. 16 illustrates a short sell where the user has selected Stop Loss from the Stop Loss or Limit options 152. As such, the input box 156 into which the user may enter a Limit Price is not displayed.

FIG. 17 illustrates an example of a secondary pane 64 of a graphical user interface 20 that enables a user to execute a sell with a market order, in accordance with embodiments of the present disclosure. As illustrated, the user has selected Sell from the Transaction Type options 88, and selected Market Order from the Order Type options 94.

Figure 18:
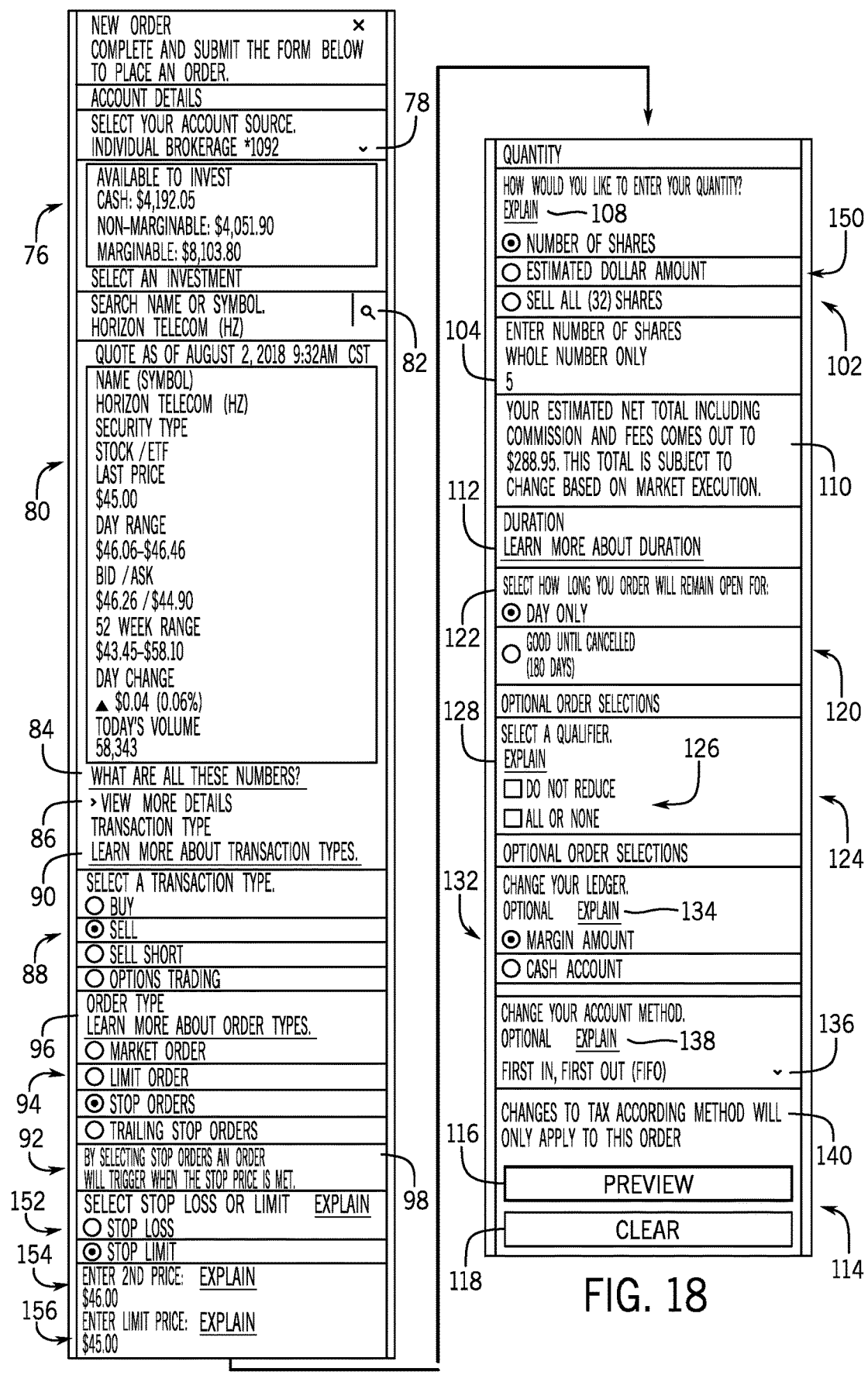
FIG. 18 illustrates an example of a secondary pane of a graphical user interface that enables a user to execute a sell with a stop limit order, in accordance with embodiments of the present disclosure.

FIG. 18 illustrates an example of a secondary pane 64 of a graphical user interface 20 that enables a user to execute a sell with a stop limit order, in accordance with embodiments of the present disclosure. As illustrated, the user has selected Sell from the Transaction Type options 88, and selected Stop Orders from the Order Type options 94. As also illustrated, when the user has selected these options, in certain embodiments, the Order Type section 92 of the secondary pane 64 may include a series of Stop Loss or Limit options 152 (e.g., Stop Loss, Stop Limit, and so forth), which may be selected by the user based on the type of stop order desired by the user. In addition, in certain embodiments, the Order Type section 92 of the secondary pane 64 may include a first input box 154 into which the user may enter a Stop Price, and a second input box 156 into which the user may enter a Limit Price. FIG. 18 illustrates a sell where the user has selected Stop Limit from the Stop Loss or Limit options 152.

Figure 19:
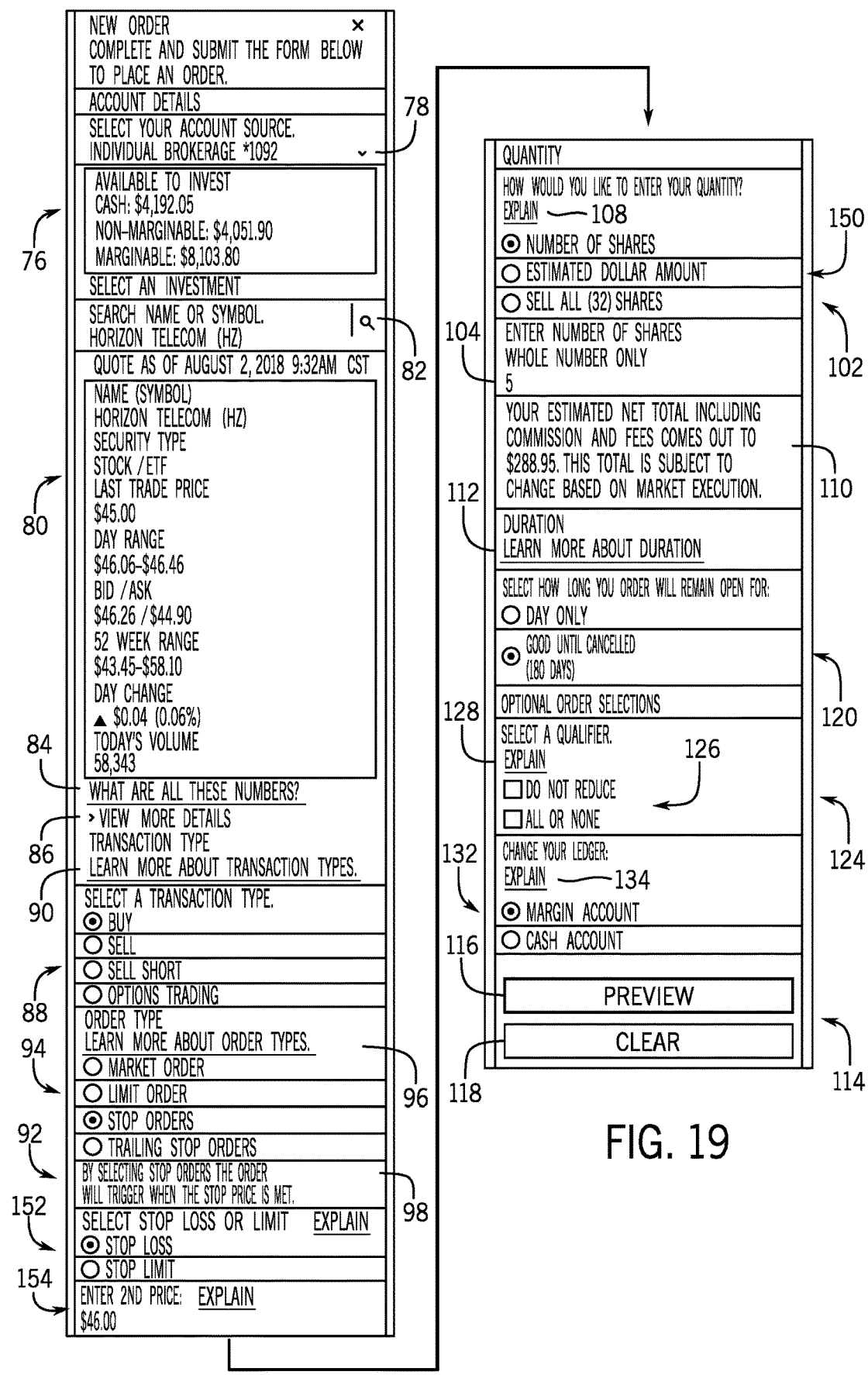
FIG. 19 illustrates an example of a secondary pane of a graphical user interface that enables a user to execute a sell with a stop loss order, in accordance with embodiments of the present disclosure.

FIG. 19 illustrates an example of a secondary pane 64 of a graphical user interface 20 that enables a user to execute a sell with a stop loss order, in accordance with embodiments of the present disclosure. As illustrated, the user has again selected Sell from the Transaction Type options 88, and selected Stop Orders from the Order Type options 94.

However, as opposed to FIG. 18, FIG. 19 illustrates a sell where the user has selected Stop Loss from the Stop Loss or Limit options 152. As such, the input box 156 into which the user may enter a Limit Price is not displayed.

FIG. 20 illustrates an example of a secondary pane 64 of a graphical user interface 20 that enables a user to execute a buy with a trailing stop limit order, in accordance with embodiments of the present disclosure. As illustrated, the user has selected Buy from the Transaction Type options 88, and selected Trailing Stop Orders from the Order Type options 94. As also illustrated, when the user has selected these options, in certain embodiments, the Order Type section 92 of the secondary pane 64 may include a series of Trailing Stop Loss or Limit options 158 (e.g., Trailing Stop Loss, Trailing Stop Limit, and so forth), which may be selected by the user based on the type of stop order desired by the user. In addition, in certain embodiments, the Order Type section 92 of the secondary pane 64 may include two tabs 160, 162 that enable the user to select either a Dollar amount for the trail amount or a Percentage amount (e.g., relative to the Trade Price for the particular security), respectively, as well as an input box 164 to enter the trail amount (e.g., either in a Dollar amount or a Percentage amount, depending on the selection via the tabs 160, 162, and a drop-down menu 166 to select what criteria (e.g., Last Trade Price, and so forth) the trail amount is based upon. FIG. 20 illustrates a buy where the user has selected Trailing Stop Limit from the Trailing Stop Loss or Limit options 158, and where the user has selected the Dollar amount tab 160, entered a trail (e.g., Dollar) amount via the input box 164, and selected to have the trail price based on Last Trade Price via the drop-down menu 166.

Figure 21:
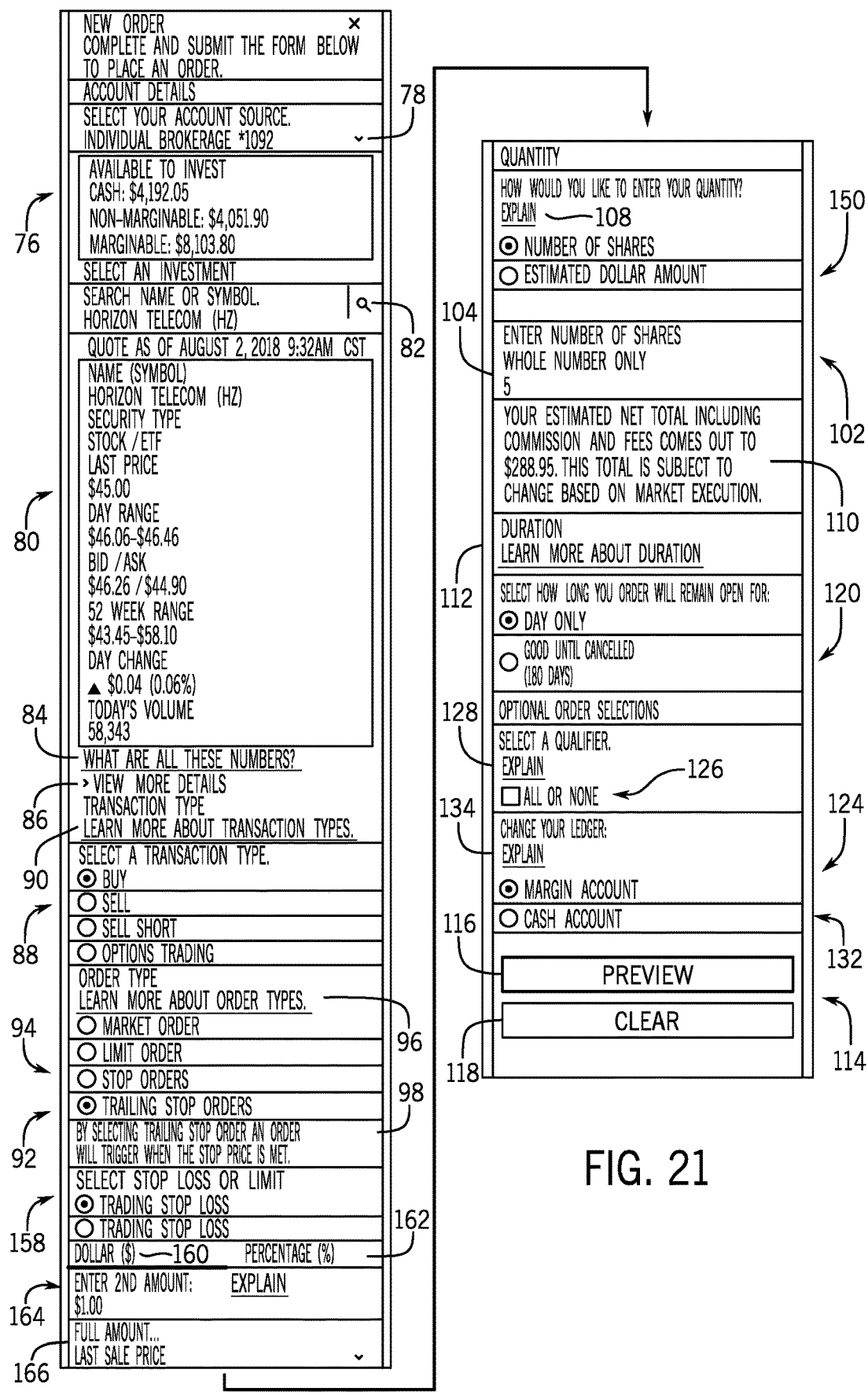
FIG. 21 illustrates an example of a secondary pane of a graphical user interface that enables a user to execute a buy with a trailing stop loss order, in accordance with embodiments of the present disclosure.

FIG. 21 illustrates an example of a secondary pane 64 of a graphical user interface 20 that enables a user to execute a buy with a trailing stop loss order, in accordance with embodiments of the present disclosure. As illustrated, the user has again selected Buy from the Transaction Type options 88, and selected Trailing Stop Orders from the Order Type options 94. However, as opposed to FIG. 20, FIG. 21 illustrates a buy where the user has selected Trailing Stop Loss from the Trailing Stop Loss or Limit options 158. In the illustrated embodiment, the other options via the Dollar amount tab 160, the input box 164, and the drop-down menu 166 are the same as illustrated in FIG. 20.

Figure 22:
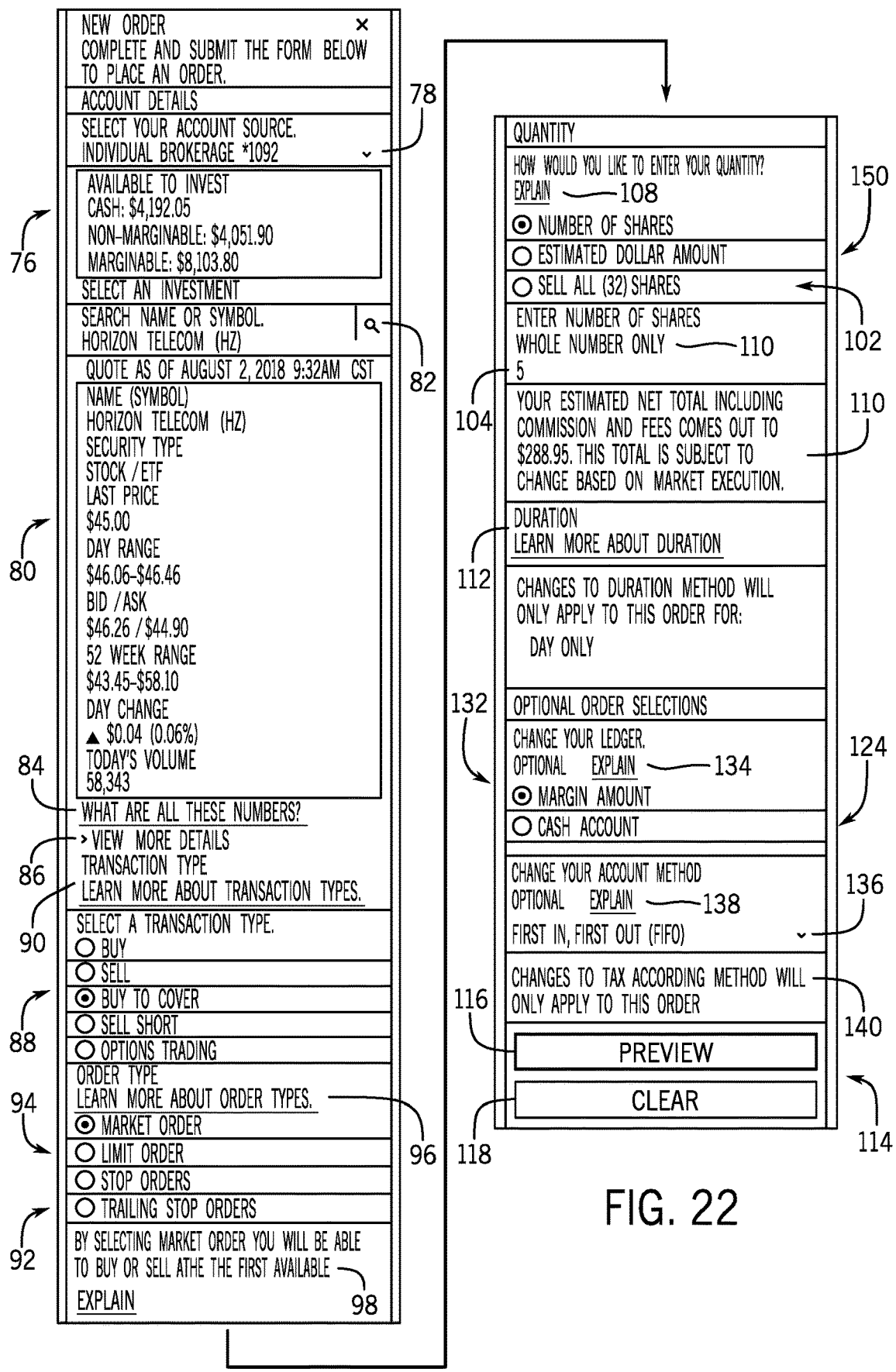
FIG. 22 illustrates an example of a secondary pane of a graphical user interface that enables a user to execute a buy to cover with a market order, in accordance with embodiments of the present disclosure.

FIG. 22 illustrates an example of a secondary pane 64 of a graphical user interface 20 that enables a user to execute a buy to cover with a market order, in accordance with embodiments of the present disclosure. As illustrated, the user has selected Buy to Cover from the Transaction Type options 88, and selected Market Order from the Order Type options 94.

Figure 23:
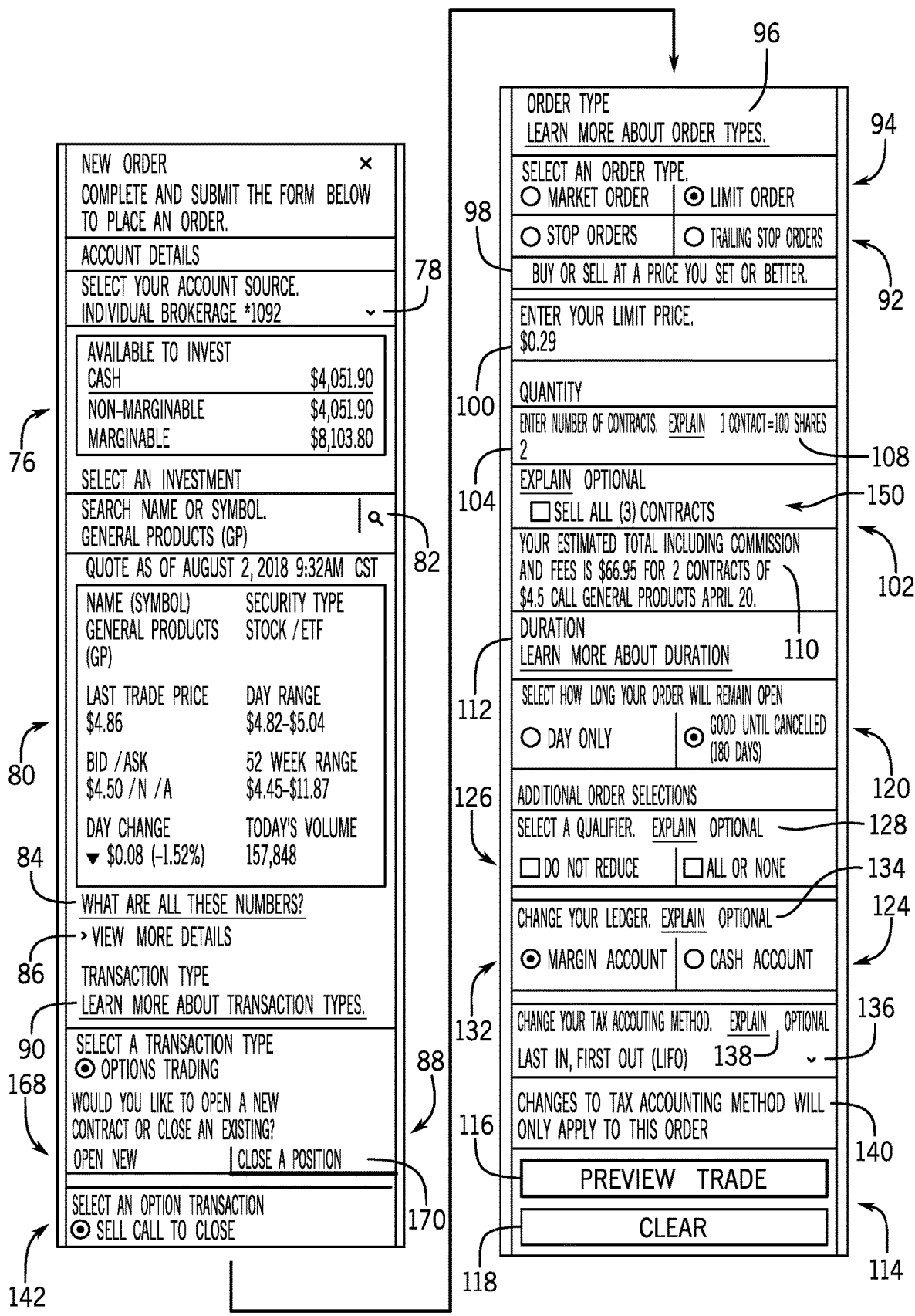
FIG. 23 illustrates an example of a secondary pane of a graphical user interface that enables a user to close an options trading position, in accordance with embodiments of the present disclosure.

FIGS. 23 through 26 illustrate examples of a secondary pane 64 of a graphical user interface 20 that enable options trading, in accordance with embodiments of the present disclosure. For example, FIG. 23 illustrates an example of a secondary pane 64 of a graphical user interface 20 that enables a user to close an options trading position, in accordance with embodiments of the present disclosure. As illustrated in FIG. 23, the user has selected Options Trading from the Transaction Type options 88. As also illustrated in FIG. 23, in certain embodiments, when the Options Trading selection has been made via the Transaction Type options 88, the Search Results section 80 of the secondary pane 64 may include two tabs 168, 170 that enable the user to select to open a new options trading position (i.e., Open New) or to close an options trading position (i.e., Close a Position), respectively, which may be displayed directly underneath the Transaction Type options 88. In addition, in certain embodiments, the Search Results section 80 of the secondary pane 64 may include a series of Options Transaction Type options 172 (e.g., Buy Call to Open Sell Call to Open, Buy Put to Open, Sell Put to Open, and so forth), which may be selected by the user based on the type of options trade desired by the user. As illustrated in FIG. 23, the user has selected Sell Call to Close from the Options Transaction Type options 172, and has selected Limit Order from the Order Type options 94.

Figure 24:
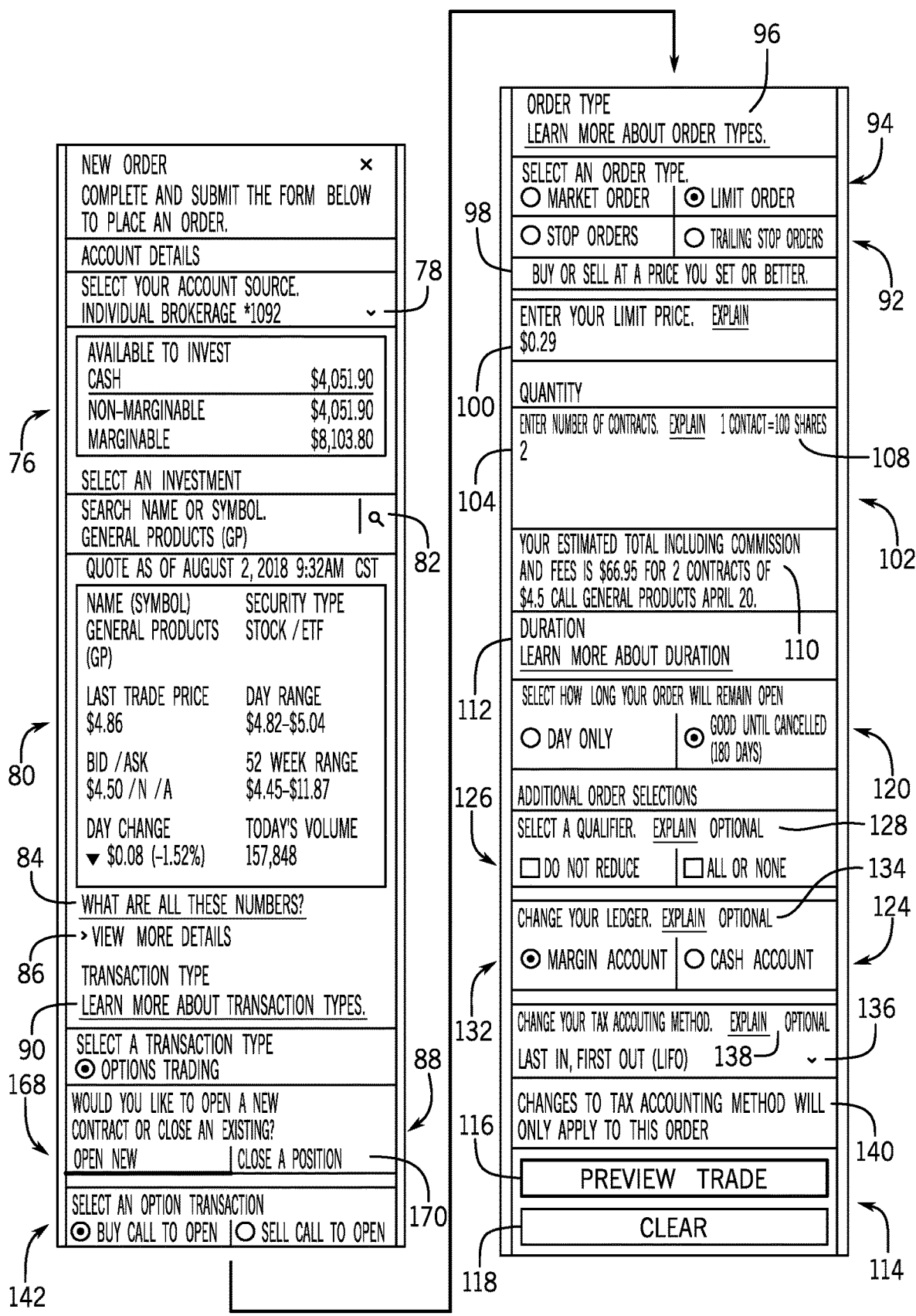
FIG. 24 illustrates an example of a secondary pane of a graphical user interface that enables a user to open a new options trading position, in accordance with embodiments of the present disclosure.

FIG. 24 illustrates an example of a secondary pane 64 of a graphical user interface 20 that enables a user to open a new options trading position, in accordance with embodiments of the present disclosure. As illustrated in FIG. 24, the user has selected Options Trading from the Transaction Type options 88, has selected Open New from the tab 168, has selected Buy Call to Open from the Options Transaction Type options 172, and has selected Limit Order from the Order Type options 94.

Figure 25:
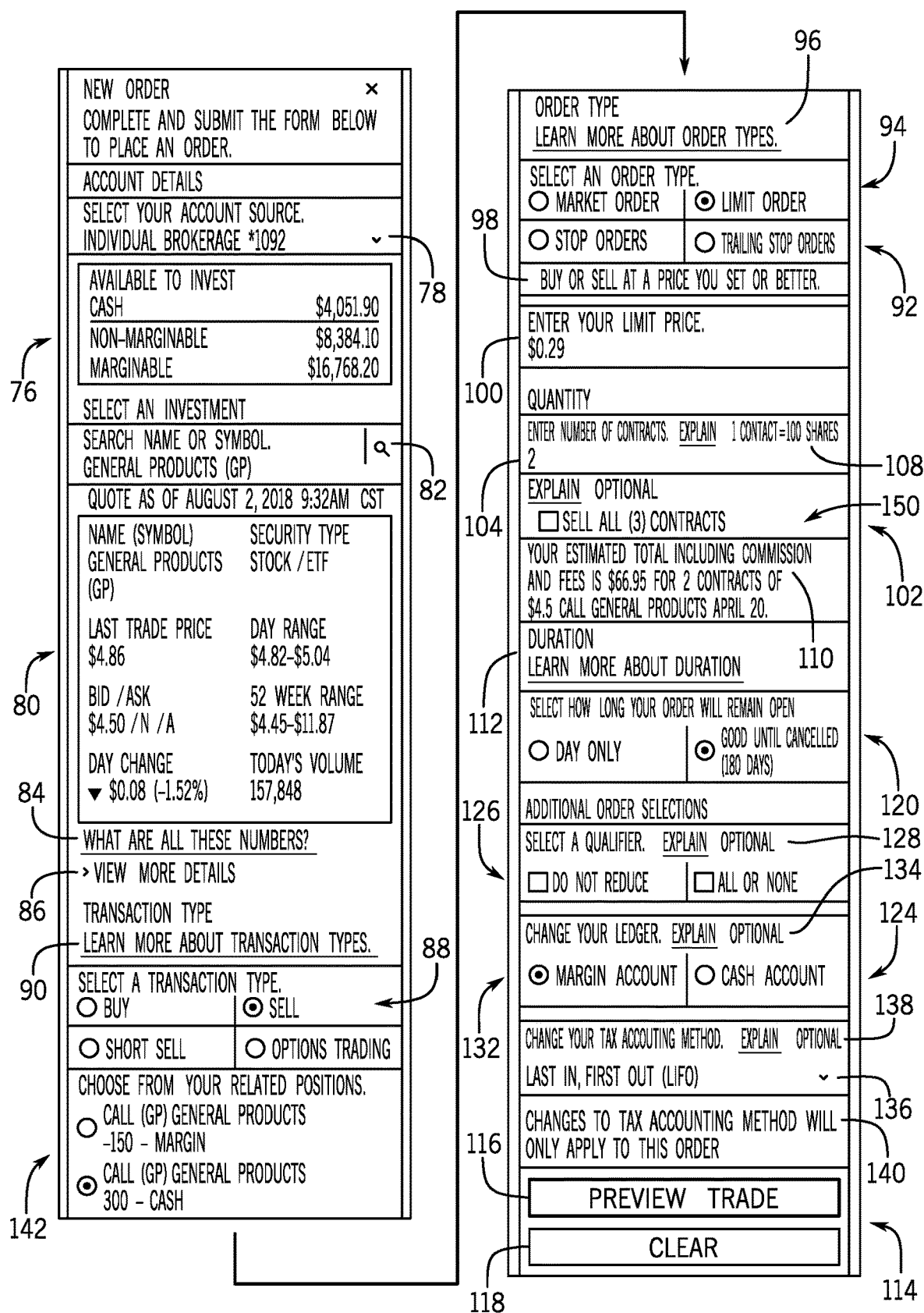
FIG. 25 illustrates an example of a secondary pane of a graphical user interface that enables a user to execute a sell of one of multiple options positions for an account, in accordance with embodiments of the present disclosure.

FIG. 25 illustrates an example of a secondary pane 64 of a graphical user interface 20 that enables a user to execute a sell of one of multiple options positions for an account, in accordance with embodiments of the present disclosure. In the illustrated embodiment, when the user selects a particular security to sell an options position for, the account may have multiple positions relating to the particular security. When this happens, a series of Position options 142 may be presented in the Search Results section 80, which enable the user to select a particular position to sell. Once the user selects a particular position via the Position options 142, the secondary pane 64 may continue being generated (e.g., to display the Order Type section 92, Quantity section 102, Additional Order Selections section 124, Preview/Clear section 114, and so forth, as described above).

FIG. 26 illustrates an example of a secondary pane 64 of a graphical user interface 20 that enables a user to buy an option call to open, in accordance with embodiments of the present disclosure. As illustrated in FIG. 26, the user has selected Options Trading from the Transaction Type options 88, and has selected Buy Call to Open from the Options Transaction Type options 172. Based on these inputs, the secondary pane 64 of the graphical user interface 20 may display an Options Contract section 174 just underneath the Search Results section 80 (and just before displaying the Order Type section 92). In the interest of guiding the user, in certain embodiments, the Options Contract section 174 of the secondary pane 64 may also include a link 176 (e.g., "Learn more about options contracts"), which may be clicked by the user to, for example, provide more information via the secondary pane 64 relating to the options contracts. As illustrated, in certain embodiments, the Options Contract section 174 may also include a drop-down menu 178 to select an Expiration Date, and an input box 180 to select a Strike Price.

FIGS. 27 through 36 illustrate examples of a secondary pane 64 of a graphical user interface 20 that enable mutual fund trading, in accordance with embodiments of the present disclosure. For example, FIG. 27 illustrates an example of a secondary pane 64 of a graphical user interface 20 that enables a user to buy a mutual fund, in accordance with embodiments of the present disclosure. As illustrated, the user has selected Buy from the Transaction Type options 88. It is noted that, in certain embodiments, when the currently selected security (e.g., via the Search Results section 80 of the secondary pane 64) is a mutual fund, additional options for exchanging funds into or from the selected mutual fund (e.g., Exchange from AGMFX, Exchange into AGMFX, and so forth) may be presented via the Transaction Type options 88. In addition, in certain embodiments, when the currently selected security is a mutual fund, a new Purchase Amount section 182 of the secondary pane 64 may be rendered underneath the Search Results section 80, which may include an input box 184 into which the user may enter a purchase amount to buy. In addition, in certain embodiments, the Purchase Amount section 182 of the secondary pane 64 may also include a message 186 relating to a minimum dollar amount that may be bought. In addition, in certain embodiments, the Purchase Amount section 182 of the secondary pane 64 may also include a helpful hint 188 relating to the mutual fund transaction, such as the estimated net total including fees.

Figure 28:
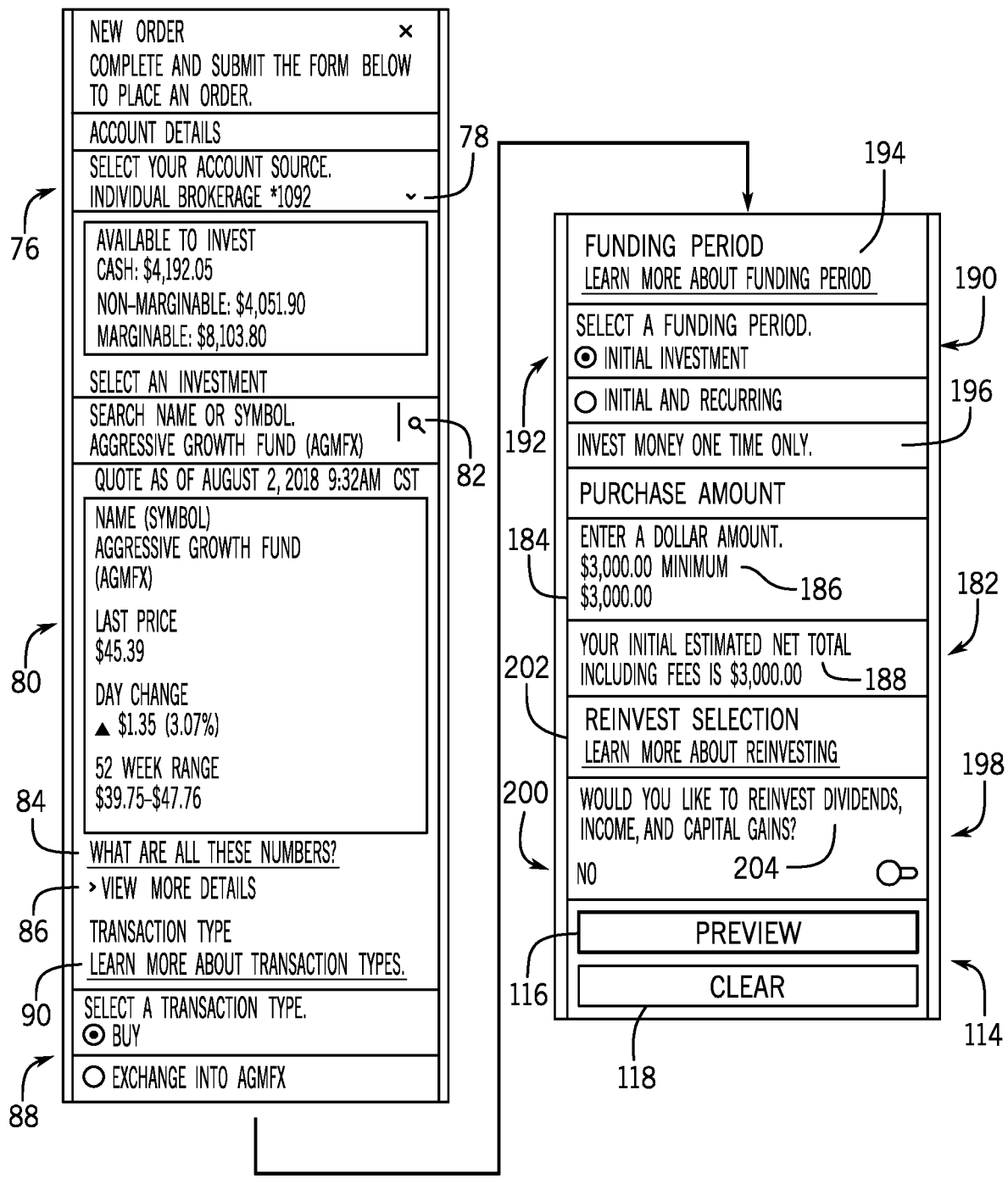
FIG. 28 illustrates an example of a secondary pane of a graphical user interface that enables a user to buy a mutual fund subject to a funding period and reinvestment options, in accordance with embodiments of the present disclosure.

FIG. 28 illustrates an example of a secondary pane 64 of a graphical user interface 20 that enables a user to buy a mutual fund subject to a funding period and reinvestment options, in accordance with embodiments of the present disclosure. As illustrated, the user has selected Buy from the Transaction Type options 88. As also illustrated, in certain embodiments, when the currently selected security is a mutual fund, a new Funding Period section 190 of the secondary pane 64 may be rendered underneath the Search Results section 80 and above the Purchase Amount section 182, which may include a series of Funding Period options 192 (e.g., Initial Investment, Initial and Recurring, and so forth), which may be selected by the user based on the type of funding period desired by the user. In the interest of guiding the user, in certain embodiments, the Funding Period section 190 of the secondary pane 64 may also include a link 194 (e.g., "Learn more about funding period"), which may be clicked by the user to, for example, provide more information via the secondary pane 64 relating to the various funding period options. In addition, in certain embodiments, the Funding Period section 190 of the secondary pane 64 may also include a helpful hint 196 relating to the currently selected Funding Period option. In the illustrated embodiment, the user has selected Initial Investment from the Funding Period options 192.

As also illustrated, in certain embodiments, when the currently selected security is a mutual fund, a new Reinvestment Selection section 198 of the secondary pane 64 may be rendered underneath the Purchase Amount section 182, which may include a Reinvestment Selection option 200, which may be toggled between Yes and No by the user based on the reinvestment selection desired by the user. In the interest of guiding the user, in certain embodiments, the Reinvestment Selection section 198 of the secondary pane 64 may also include a link 202 (e.g., "Learn more about reinvesting"), which may be clicked by the user to, for example, provide more information via the secondary pane 64 relating to the reinvesting options. In addition, in certain embodiments, the Reinvestment Selection section 198 of the secondary pane 64 may also include a helpful hint 204 relating to reinvesting options. In the illustrated embodiment, the user has selected to not reinvest dividends, income, and capital gains into the selected mutual fund from the Reinvestment Selection option 200.

Figure 29:
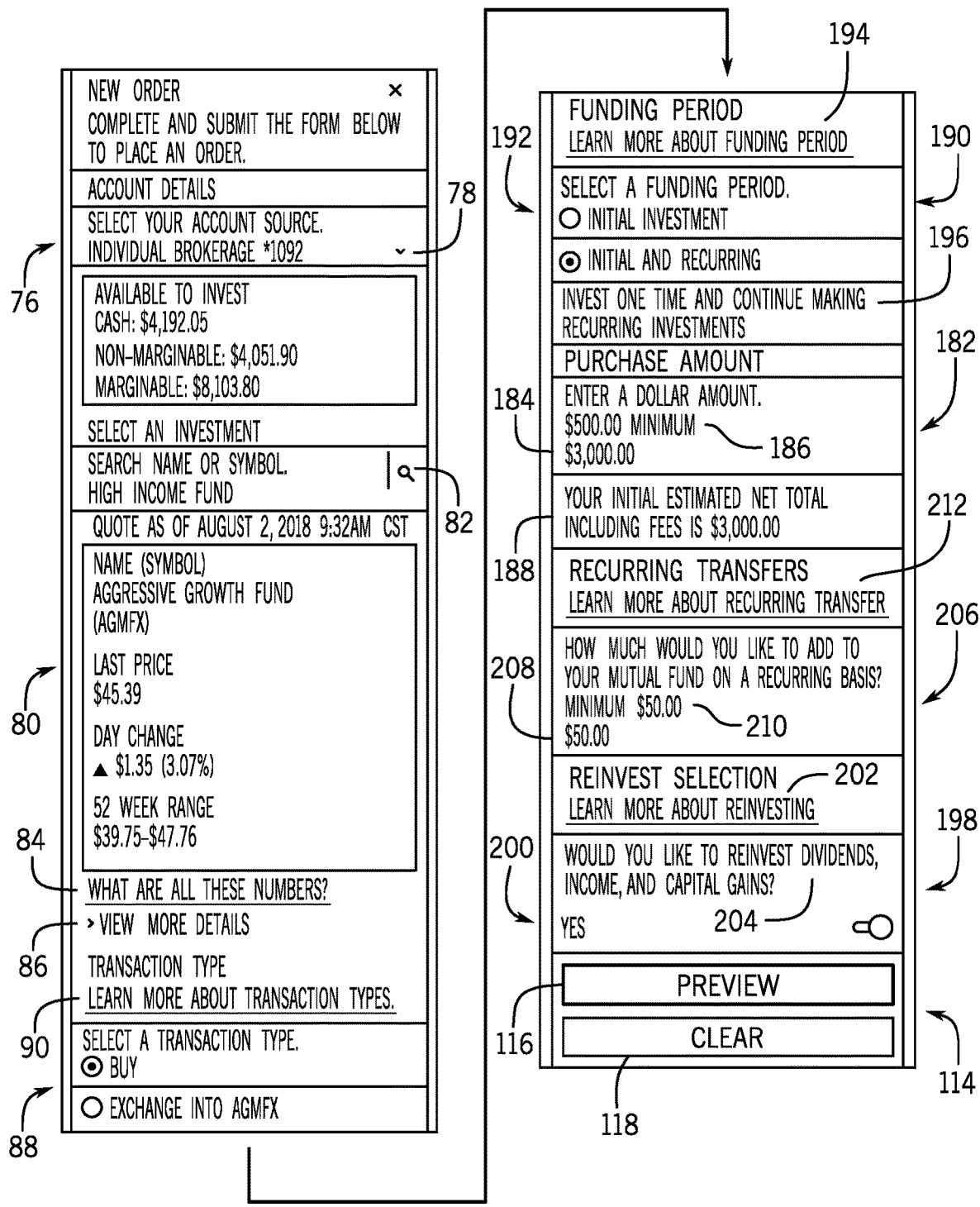
FIG. 29 illustrates an example of a secondary pane of a graphical user interface that enables a user to buy a mutual fund subject to a funding period, recurring transfers, and reinvestment options, in accordance with embodiments of the present disclosure.

FIG. 29 illustrates an example of a secondary pane 64 of a graphical user interface 20 that enables a user to buy a mutual fund subject to a funding period, recurring transfers, and reinvestment options, in accordance with embodiments of the present disclosure. As illustrated, the user has selected Buy from the Transaction Type options 88, has selected Initial Investment from the Funding Period options 192, and has selected to reinvest dividends, income, and capital gains into the selected mutual fund from the Reinvestment Selection option 200. As also illustrated, in certain embodiments, when the currently selected security is a mutual fund, a new Recurring Transfers section 206 of the secondary pane 64 may be rendered underneath the Purchase Amount section 182 and above the Reinvestment Selection section 198, which may include an input box 208 into which the user may enter an amount to add to the selected mutual fund on a recurring basis. In addition, in certain embodiments, the Recurring Transfers section 206 of the secondary pane 64 may also include a message 210 relating to a minimum dollar amount that may be added to the selected mutual fund on a recurring basis. In the interest of guiding the user, in certain embodiments, the Recurring Transfers section 206 of the secondary pane 64 may also include a link 212 (e.g., "Learn more about recurring transfers"), which may be clicked by the user to, for example, provide more information via the secondary pane 64 relating to the recurring transfers.

Figure 30:
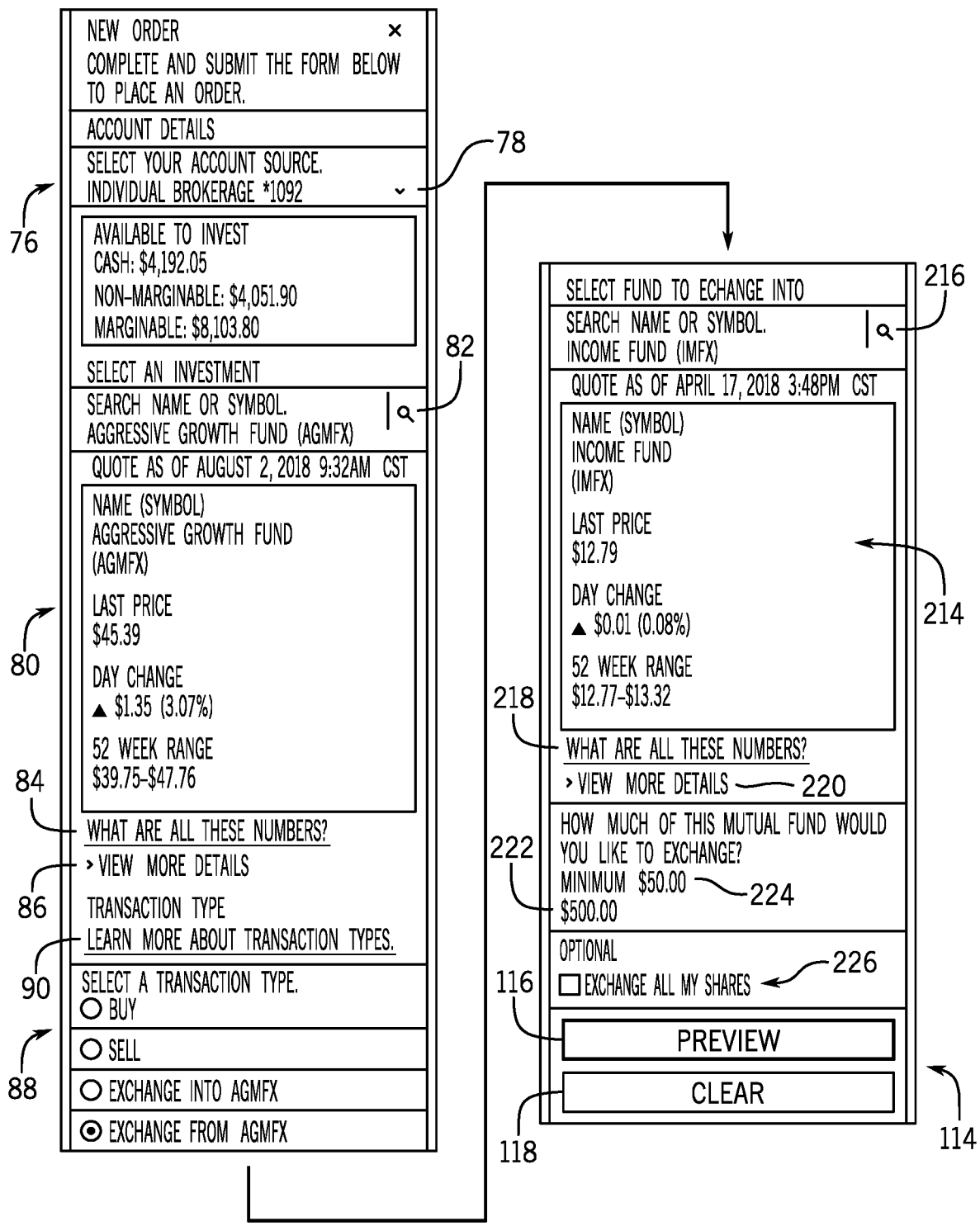
FIG. 30 illustrates an example of a secondary pane of a graphical user interface that enables an exchange of funds from a selected mutual fund into another mutual fund, in accordance with embodiments of the present disclosure.

FIG. 30 illustrates an example of a secondary pane 64 of a graphical user interface 20 that enables an exchange of funds from a selected mutual fund into another mutual fund, in accordance with embodiments of the present disclosure. As illustrated, the user has selected Exchange from AGMFX (i.e., a currently selected mutual fund) from the Transaction Type options 88. As also illustrated, in certain embodiments, when the user has selected the Exchange from option from the Transaction Type options 88, a new Select Fund to Exchange Into section 214 of the secondary pane 64 may be rendered underneath the Search Results section 80, which may include a search box 216 that is substantially similar to the search box 82 in the Search Results section 80 of the secondary pane 64, and which enables the user to select a second mutual fund (e.g., IMFX) into which funds should be exchanged from the first mutual fund (e.g., AGMFX). In the interest of guiding the user, in certain embodiments, the Select Fund to Exchange Into section 214 of the secondary pane 64 may also include a link 218 (e.g., "What are all these numbers?), which may be clicked by the user to, for example, provide more information via the secondary pane 64 relating to the significance of all of the various numbers presented in the Select Fund to Exchange Into section 214. In addition, in certain embodiments, the Select Fund to Exchange Into section 214 of the secondary pane 64 may also include a View More Details link 220, which may be clicked by the user to, for example, provide more information relating to the mutual fund selected via the Select Fund to Exchange Into section 214. As also illustrated, in certain embodiments, the Select Fund to Exchange Into section 214 may also include an input box 222 into which the user may enter an amount to exchange from the first mutual fund (e.g., AGMFX) into the second mutual fund (e.g., IMFX). In addition, in certain embodiments, the Select Fund to Exchange Into section 214 of the secondary pane 64 may also include a message 224 relating to a minimum dollar amount that may be exchanged. In addition, in certain embodiments, the Select Fund to Exchange Into section 214 of the secondary pane 64 may also include a check box 226 relating to whether the user wishes to exchange funds for all shares of the first mutual fund (e.g., AGMFX) into the second mutual fund (e.g., IMFX).

FIG. 31 illustrates an example of a secondary pane 64 of a graphical user interface 20 that enables an exchange of funds into a selected mutual fund from another mutual fund, in accordance with embodiments of the present disclosure. As illustrated, the user has selected Exchange into AGMFX (i.e., a currently selected mutual fund) from the Transaction Type options 88. As also illustrated, in certain embodiments, when the user has selected the Exchange into option from the Transaction Type options 88, a new Select Fund to Exchange From section 228 of the secondary pane 64 may be rendered underneath the Search Results section 80, which may include a search box 230 that is substantially similar to the search box 82 in the Search Results section 80 of the secondary pane 64, and which enables the user to select a second mutual fund (e.g., IMFX) from which funds should be exchanged into the first mutual fund (e.g., AGMFX). As also illustrated, in certain embodiments, the Select Fund to Exchange From section 228 may also include an input box 232 into which the user may enter an amount to exchange into the first mutual fund (e.g., AGMFX) from the second mutual fund (e.g., IMFX). In addition, in certain embodiments, the Select Fund to Exchange From section 228 of the secondary pane 64 may also include a message 234 relating to a minimum dollar amount that may be exchanged. In addition, in certain embodiments, the Select Fund to Exchange From section 228 of the secondary pane 64 may also include a check box 236 relating to whether the user wishes to exchange funds for all shares of the second mutual fund (e.g., IMFX) into the first mutual fund (e.g., AGMFX).

Figure 32:
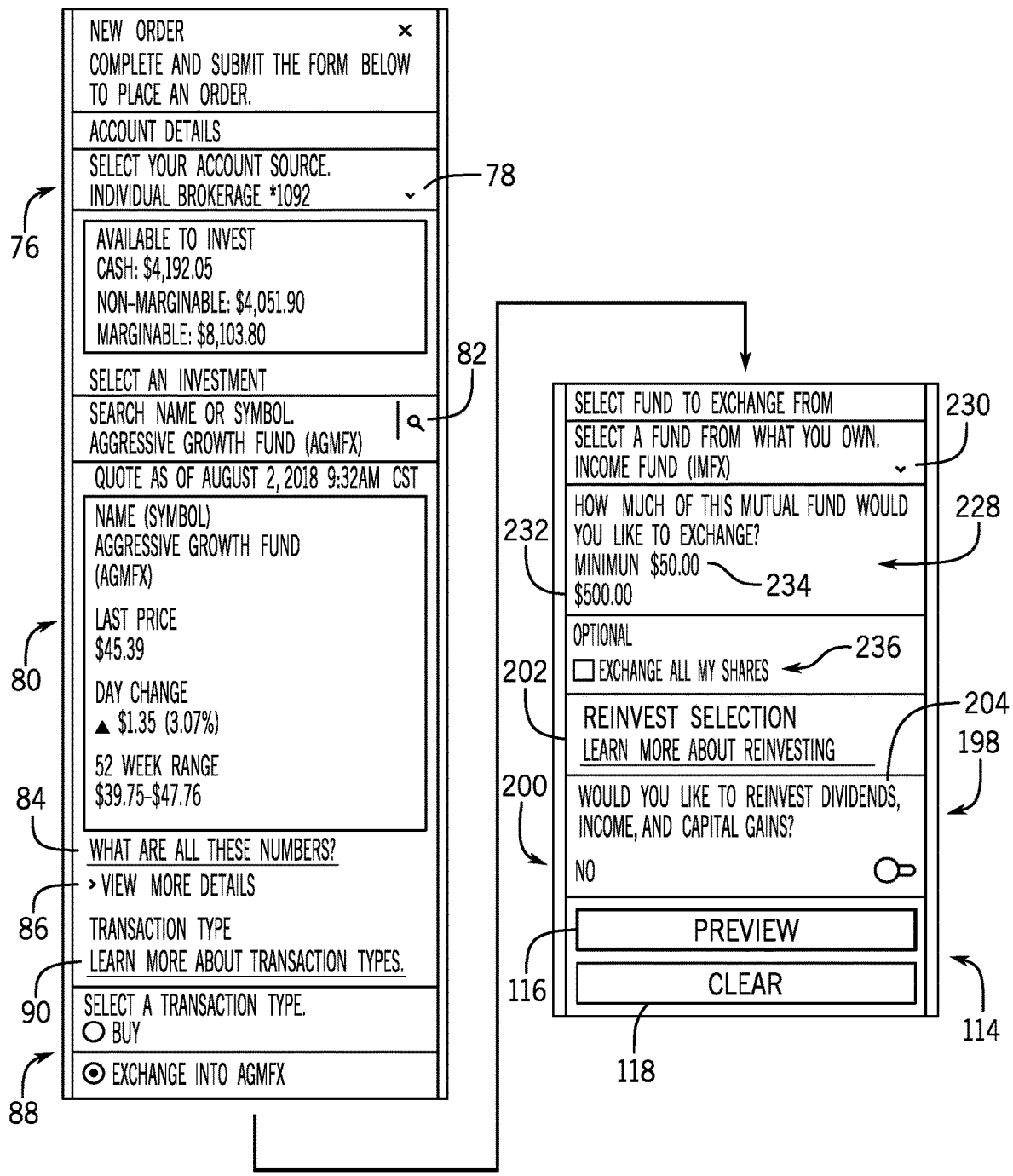
FIG. 32 illustrates an example of a secondary pane of a graphical user interface that enables an exchange of funds into a selected mutual fund from another mutual fund with a reinvestment option selected, in accordance with embodiments of the present disclosure.

FIG. 32 illustrates an example of a secondary pane 64 of a graphical user interface 20 that enables an exchange of funds into a selected mutual fund from another mutual fund with a reinvestment option selected, in accordance with embodiments of the present disclosure. In general, the financial trade illustrated in FIG. 32 is substantially similar to the financial trade illustrated in FIG. 31. However, in the financial trade illustrated in FIG. 32, the graphical user interface 20 has displayed the Reinvestment Selection option 200, for example, because reinvestment is an option for the particular mutual fund selected.

Figure 33:
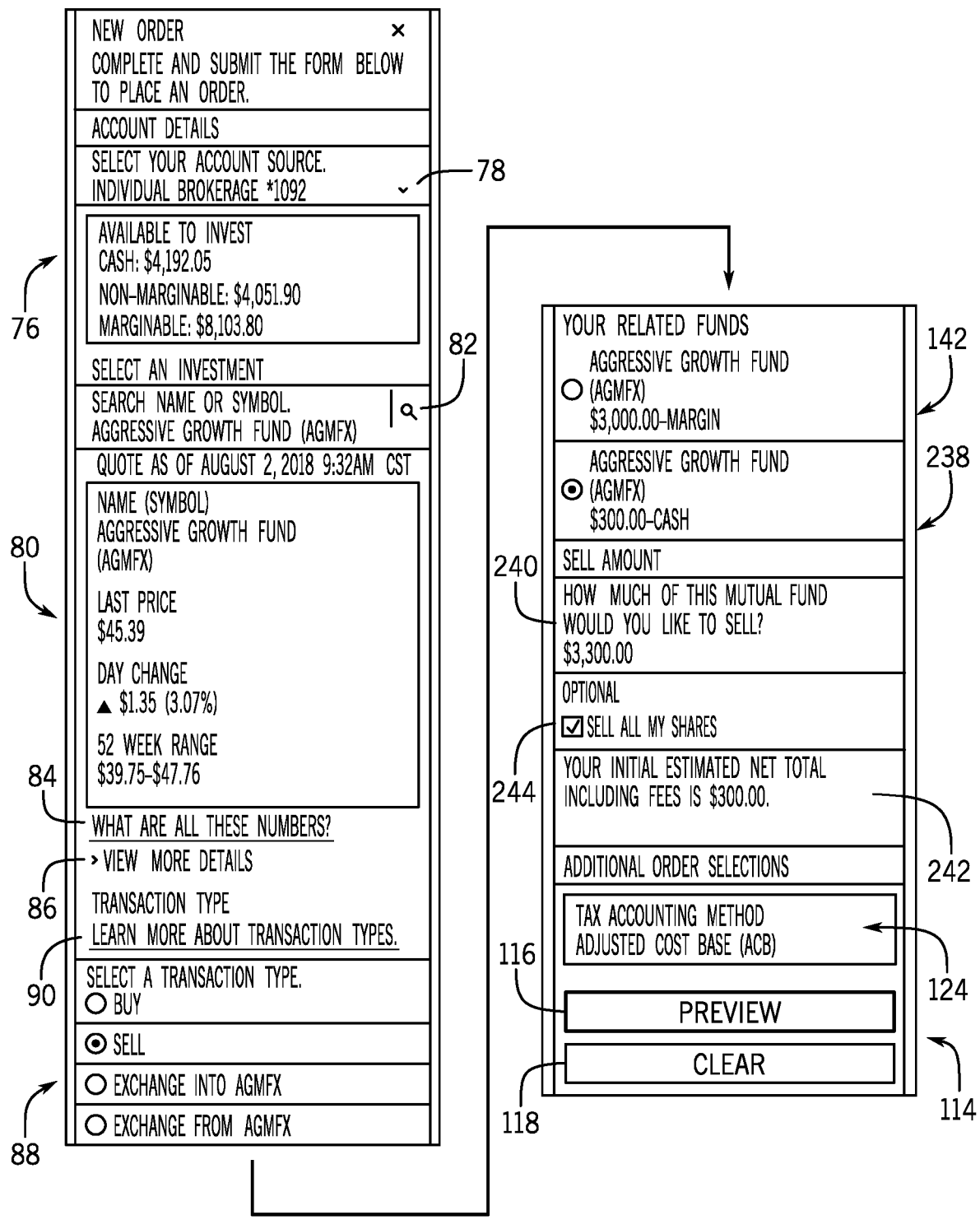
FIG. 33 illustrates an example of a secondary pane of a graphical user interface that enables a user to execute a sell of one of multiple mutual fund positions for an account, in accordance with embodiments of the present disclosure.

FIG. 33 illustrates an example of a secondary pane 64 of a graphical user interface 20 that enables a user to execute a sell of one of multiple mutual fund positions for an account, in accordance with embodiments of the present disclosure. In the illustrated embodiment, when the user selects a particular mutual fund to sell, the account may have multiple positions relating to the particular mutual fund. When this happens, a series of Position options 142 may be presented in the Search Results section 80, which enable the user to select a particular position to sell. Once the user selects a particular position to sell via the Position options 142, a new Sell Amount section 238 of the secondary pane 64 may be rendered underneath the Position options 142, which may include an input box 240 into which the user may enter a dollar amount to sell. In addition, in certain embodiments, the Sell Amount section 238 of the secondary pane 64 may also include a helpful hint 242 relating to the mutual fund transaction, such as the estimated net total including fees. In addition, in certain embodiment, the Sell Amount section 238 of the secondary pane 64 may also include an option 244 to sell all shares for the selected mutual fund position, which has been selected by the user.

Figure 34:
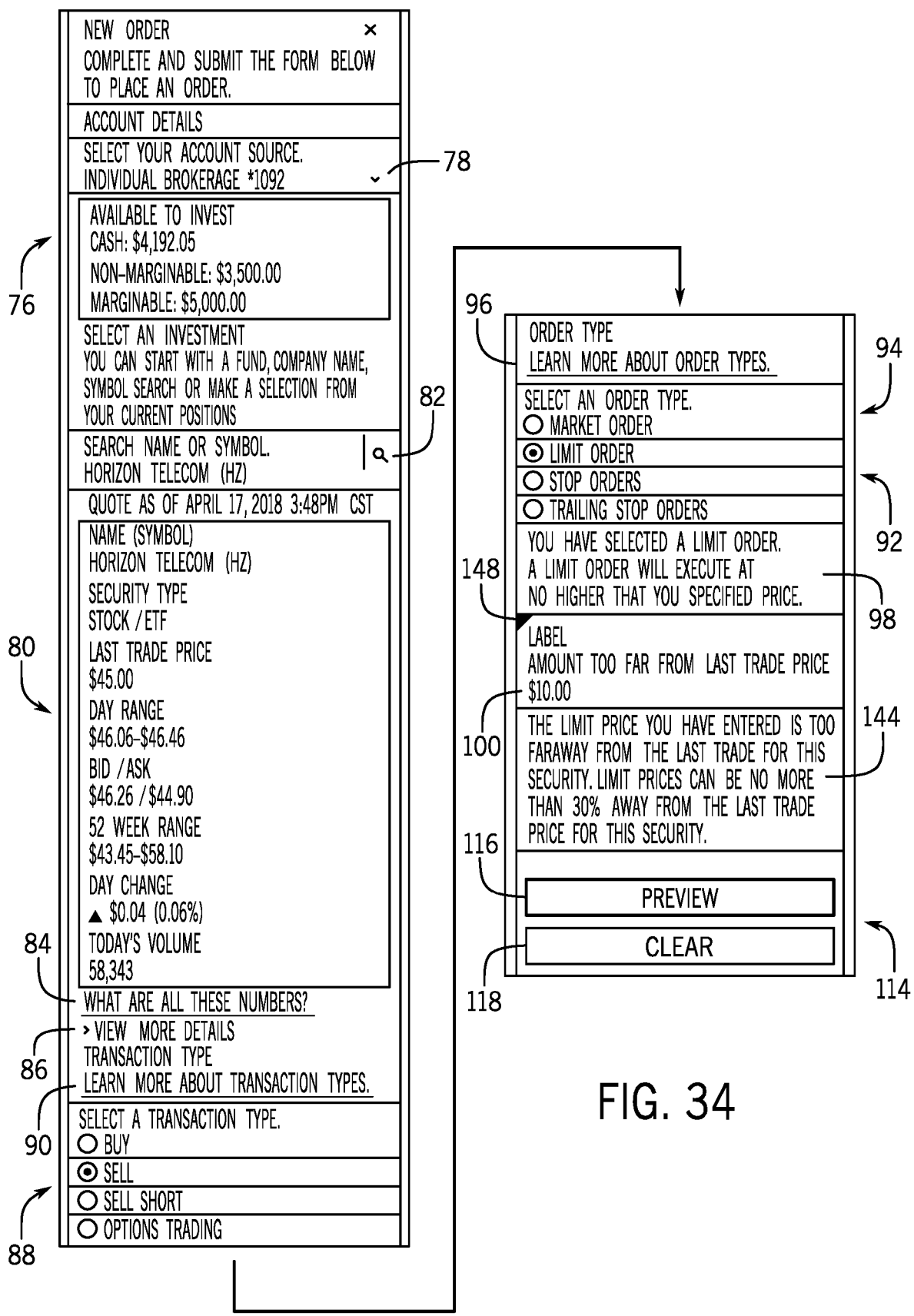
FIG. 34 illustrates another example of a secondary pane of a graphical user interface that has generated an error message, in accordance with embodiments of the present disclosure.

As described above, sometimes, when a user makes a selection via the secondary pane 64, the selections may generate an error. Again, as opposed to conventional techniques where the error may not be generated until the user submits a completed order, the embodiments described herein generate and display errors inline with respect to the secondary pane 64. For example, in certain embodiments, an error message 144 may be displayed directly under the encapsulated component 32 that generated the error. For example, FIG. 34 illustrates another example of a secondary pane 64 of a graphical user interface 20 that has generated an error message, in accordance with embodiments of the present disclosure. As illustrated, the user has selected Sell from the Transaction Type options 88, and selected Limit Order from the Order Type options 94. However, in certain embodiments, when the user entered a limit order price via the input box 100, an error message 144 may be generated that notifies the user that the limit order price that was entered is too far away from the last trade price. In addition, the error message 144 may provide helpful hints relating to the reasons why the error message 144 was generated (e.g., that the limit order price cannot be more than 30% away from the last trade price). In addition, in certain embodiments, a visual indicator 148 (e.g., a red mark or some other indicator) of the error may be displayed proximate the encapsulated component 32 that generated the error (e.g., the input box 100 relating to the limit order price, in the illustrated view).

For any single financial trade entered by the user via the secondary pane 64 of the graphical user interface 20, when the user clicks on the Preview button 116 of the Preview/Clear section 114, the results of the financial trade may be previewed before placing an order to execute the entered financial trade. For example, FIG. 35 illustrates an example of a secondary pane 64 of a graphical user interface 20 where the user has clicked on the Preview button 116, in accordance with embodiments of the present disclosure. As illustrated in FIG. 35, when the user clicks on the Preview button 116, the secondary pane 64 of the graphical user interface 20 displays an Order Details section 246 that includes a summary all of the details regarding the options that were selected by the user for the particular financial trade. In addition, in certain embodiments, the Order Details section 246 of the secondary pane 64 may include a helpful hint 248 relating to the Order Details, such as the amount of time it may take to financial trade to be executed, and things to expect during the pendency. In addition, in certain embodiments, the Preview/Clear section 114 may be replaced by a Place Order/Edit section 250. Specifically, a Place Order button 252 of the Place Order/Edit section 250 may be clicked by the user to place an order for the financial trade selected by the user, and an Edit button 254 of the Place Order/Edit section 250 may be clicked by the user to edit the financial trade selected by the user from the secondary pane 64.

Figure 36:
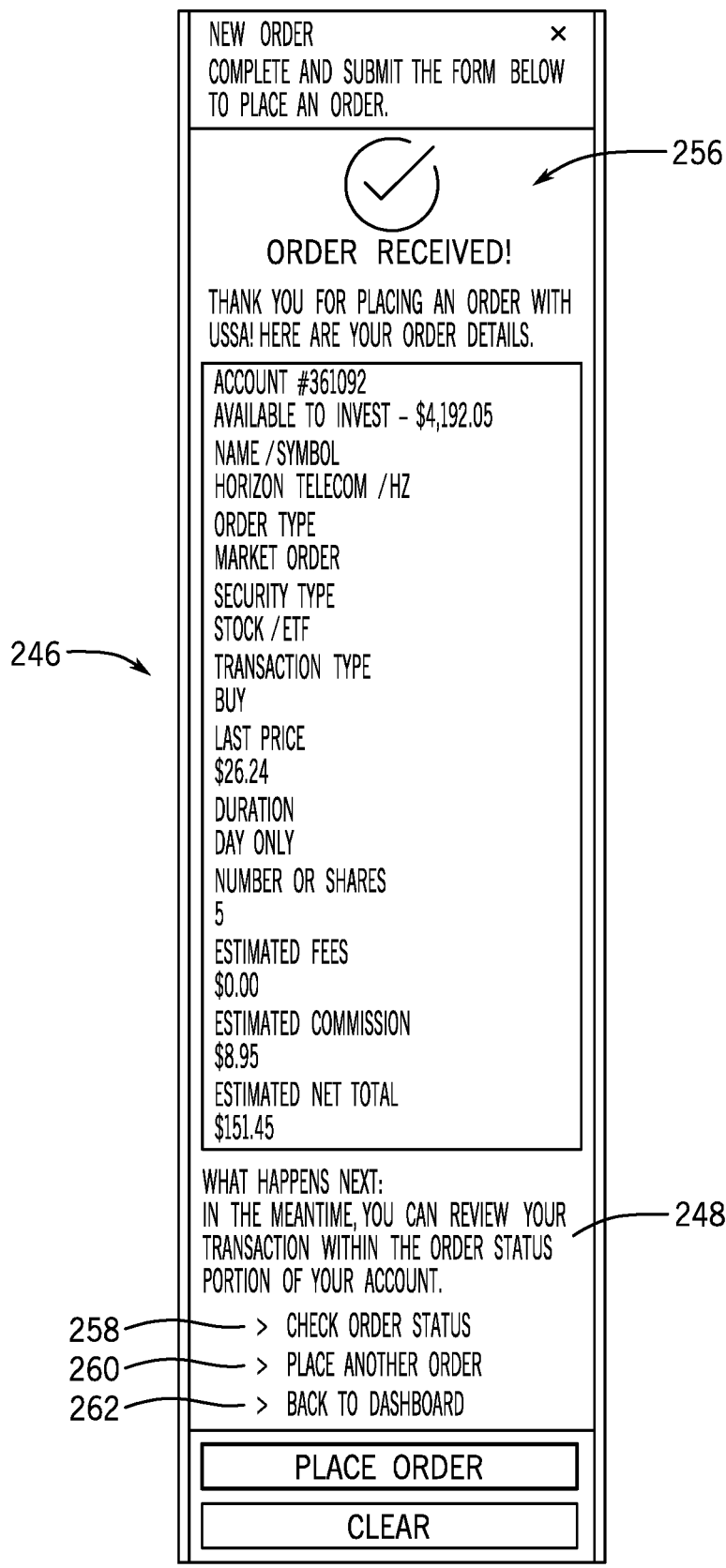
FIG. 36 illustrates an example of a secondary pane of a graphical user interface where the user has clicked on a Place Order button, in accordance with embodiments of the present disclosure.

Once the user clicks on the Place Order button 252, the financial trade order is submitted (e.g., executed by the user interface generation system 12 by communicating with the financial trading system 14 and/or the one or more financial markets 16). FIG. 36 illustrates an example of a secondary pane 64 of a graphical user interface 20 where the user has clicked on the Place Order button 252, in accordance with embodiments of the present disclosure. As illustrated in FIG. 36, when a financial trade order is placed, the secondary pane 64 of a graphical user interface 20 renders an Order Received message 256 (e.g., near the top of the secondary pane 64) to confirm to the user that the financial trade order has been placed. In addition, in certain embodiments, a Check Order status link 258 may be displayed, which the user may click to access information relating to a current status of the order. In addition, in certain embodiments, a Place Another Order link 260 may be displayed, which the user may click to initiate another financial trade order via the secondary pane 64 of the graphical user interface 20. In addition, in certain embodiments, a Back to Dashboard link 262 may be displayed, which the user may click to go back to the main dashboard (e.g., FIG. 3A). For example, in certain embodiments, when the user clicks on the Back to Dashboard link 262, the secondary pane 64 of the graphical user interface 20 may be minimized.

While only certain features of the disclosure have been illustrated and described herein, many modifications and changes will occur to those skilled in the art. It is, therefore, to be understood that the appended claims are intended to cover all such modifications and changes as fall within the true spirit of the invention.

The invention claimed is:

1. A system comprising:
   a user interface generation system comprising one or more processors configured to:
   generate a graphical user interface configured to be displayed via a display of a user computing device, wherein the graphical user interface comprises a primary pane configured to display financial account information, and a secondary pane configured to display information relating to a financial trade of a financial instrument, and wherein the graphical user interface is configured to receive one or more inputs relating to the financial trade of the financial instrument; and
   transmit the graphical user interface to the user computing device;
   wherein the graphical user interface comprises executable code defining a plurality of components encapsulated within the graphical user interface, each component comprising one or more properties and one or more states configured to be changed in response to the one or more inputs relating to the financial trade of the financial instrument, wherein the one or more properties and the one or more states of the plurality of components relate to one or more options relating to the financial trade of the financial instrument, wherein the executable code of the graphical user interface is configured to receive the one or more inputs relating to the financial trade of the financial instrument from the plurality of components, and to add or remove at least some of the one or more properties of the plurality of components relating to the financial trade of the financial instrument as individual display elements displayed inline with respect to the secondary pane of the graphical user interface relating to the financial trade of the financial instrument as a visual representation of progression of the one or more inputs relating to the financial trade of the financial instrument within a columnar view of the secondary pane of the graphical user interface relating to the financial trade of the financial instrument without generating a new view of the secondary pane of the graphical user interface relating to the financial trade of the financial instrument, wherein the at least some of the one or more properties of the plurality of components are added or removed in response to one or more changes to the one or more properties and/or the one or more states of the plurality of components that are made based at least in part on the one or more inputs relating to the financial trade of the financial instrument, and wherein the individual display elements comprise one or more links that, when clicked, provide additional contextual information relating to the financial trade of the financial instrument.

2. The system of claim 1, wherein the one or more processors of the user interface generation system are configured to receive the one or more inputs relating to the financial trade of the financial instrument from the executable code of the graphical user interface, and to transmit data to the executable code based at least in part on the one or more inputs relating to the financial trade of the financial instrument.

3. The system of claim 2, wherein the executable code of the graphical user interface is configured to update the one or more properties and/or the one or more states of the plurality of components based at least in part on the data.

4. The system of claim 2, wherein the user interface generation system is configured to communicate with a financial trading system or a financial market to determine the data.

5. The system of claim 1, wherein the executable code of the graphical user interface comprises at least one component of the plurality of components configured to communicate with at least one external data source.

6. The system of claim 5, wherein the executable code is configured to update the one or more properties and/or the one or more states of the plurality of components based at least in part on data received from the at least one external data source.

7. The system of claim 5, wherein the external data source comprises a financial trading system or a financial market.

8. The system of claim 1, wherein the executable code of the graphical user interface is configured to update at least one component of the plurality of components to display an error message relating to the financial trade of the financial instrument.

9. The system of claim 8, wherein the executable code of the graphical user interface is configured to update at least one component of the plurality of components to display a corrective action relating to the error message.

10. The system of claim 1, wherein the financial instrument comprises a stock, a bond, an option, an exchange-traded fund, or a mutual fund.

11. A method comprising:
    generating, via one or more processors of a user interface generation system, a graphical user interface configured to be displayed via a display of a user computing device, wherein the graphical user interface comprises executable code defining a plurality of components encapsulated within the graphical user interface, each component comprising one or more properties and one or more states configured to be changed in response to one or more inputs relating to the financial trade of the financial instrument received by the graphical user interface, wherein the one or more properties and the one or more states of the plurality of components relate to one or more options relating to a financial trade of a financial instrument, wherein the graphical user interface comprises a primary pane configured to display financial account information, and a secondary pane configured to display information relating to the financial trade of the financial instrument, and wherein the graphical user interface is configured to receive the one or more inputs relating to the financial trade of the financial instrument;
    transmitting, via a communication component of the user interface generation system, the graphical user interface to the user computing device;
    receiving, via the graphical user interface, one or more inputs relating to the financial trade of the financial instrument from the plurality of components; and
    adding or removing, via the graphical user interface, at least some of the one or more properties of the plurality of components relating to the financial trade of the financial instrument inline as individual display elements displayed inline with respect to the secondary pane of the graphical user interface relating to the financial trade of the financial instrument as a visual representation of progression of the one or more inputs relating to the financial trade of the financial instrument within a columnar view of the secondary pane of the graphical user interface relating to the financial trade of the financial instrument without generating a new view of the secondary pane of the graphical user interface relating to the financial trade of the financial instrument, wherein the at least some of the one or more properties of the plurality of components are added or removed in response to one or more changes to the one or more properties and/or the one or more states of the plurality of components that are made based at least in part on the one or more inputs relating to the financial trade of the financial instrument, and wherein the individual display elements comprise one or more links that, when clicked, provide additional contextual information relating to the financial trade of the financial instrument.

12. The method of claim 11, comprising:
receiving, via the communication component of the user interface generation system, the one or more inputs relating to the financial trade of the financial instrument from the graphical user interface; and
transmitting, via the communication component of the user interface generation system, data to the executable code based at least in part on the one or more inputs relating to the financial trade of the financial instrument.

13. The method of claim 12, comprising updating, via the graphical user interface, the one or more properties and/or the one or more states of the plurality of components based at least in part on the data.

14. The method of claim 12, comprising communicating, via the communication component of the user interface generation system, with a financial trading system or a financial market to determine the data.

15. The method of claim 11, comprising communicating, via the graphical user interface, with at least one external data source.

16. The method of claim 15, comprising updating, via the graphical user interface, the one or more properties and/or the one or more states of the plurality of components based at least in part on data received from the at least one external data source.

17. The method of claim 15, wherein the external data source comprises a financial trading system or a financial market.

18. The method of claim 11, comprising updating, via the graphical user interface, at least one component of the plurality of components to display an error message relating to the financial trade of the financial instrument.

19. The method of claim 18, comprising updating, via the graphical user interface, at least one component of the plurality of components to display a corrective action relating to the error message.

20. The method of claim 11, wherein the financial instrument comprises a stock, a bond, an option, an exchange-traded fund, or a mutual fund.

\* \* \* \* \*